United States Patent
Slapak et al.

(10) Patent No.: US 8,855,329 B2
(45) Date of Patent: Oct. 7, 2014

(54) QUIET FAN INCORPORATING ACTIVE NOISE CONTROL (ANC)

(75) Inventors: Alon Slapak, Mazor (IL); Tzvika Fridman, Kiryat Ono (IL); Ofira Rubin, Nizanei-Oz (IL)

(73) Assignee: Silentium Ltd., Rehovot (IL)

( * ) Notice: Subject to any disclaimer, the term of this patent is extended or adjusted under 35 U.S.C. 154(b) by 1379 days.

(21) Appl. No.: 12/449,068

(22) PCT Filed: Jan. 20, 2008

(86) PCT No.: PCT/IL2008/000087
§ 371 (c)(1),
(2), (4) Date: Jul. 22, 2009

(87) PCT Pub. No.: WO2008/090544
PCT Pub. Date: Jul. 31, 2008

(65) Prior Publication Data
US 2010/0028134 A1    Feb. 4, 2010

Related U.S. Application Data

(60) Provisional application No. 60/881,518, filed on Jan. 22, 2007.

(51) Int. Cl.
| | |
|---|---|
| G10K 11/16 | (2006.01) |
| F04D 29/66 | (2006.01) |
| B23P 11/00 | (2006.01) |
| G10K 11/178 | (2006.01) |
| G06F 1/20 | (2006.01) |
| F24F 13/24 | (2006.01) |

(52) U.S. Cl.
CPC ........... *G10K 11/178* (2013.01); *G06F 1/20* (2013.01); *G10K 2210/509* (2013.01); *G10K 2210/109* (2013.01); *F24F 2013/247* (2013.01); *F24F 13/24* (2013.01); *G10K 2210/104* (2013.01)
USPC ....... 381/71.3; 381/71.1; 381/71.2; 381/71.8; 381/71.4; 381/71.5; 381/71.6; 381/71.7; 381/71.9; 381/71.11; 381/71.12; 381/71.13; 381/71.14; 381/98; 381/93; 181/201; 181/206; 181/269; 181/266; 379/406.01; 379/406.05; 379/406.08; 415/119

(58) Field of Classification Search
USPC ............. 381/71.1–71.9, 71.11–71.14, 98, 83; 181/201, 206, 269, 266; 379/406.01, 379/406.05, 406.08
See application file for complete search history.

(56) References Cited

U.S. PATENT DOCUMENTS

| | | | |
|---|---|---|---|
| 2,043,416 | A | 6/1936 | Lueg |
| 2,091,774 | A | 8/1937 | Weiland |

(Continued)

FOREIGN PATENT DOCUMENTS

| | | |
|---|---|---|
| EP | 0615224 A2 | 9/1994 |
| EP | 0759606 A2 | 2/1997 |

(Continued)

OTHER PUBLICATIONS www.worksafe.wa.gov.au/newsite/worksafe/default.html.

(Continued)

*Primary Examiner* — Davetta W Goins
*Assistant Examiner* — Kuassi Ganmavo
(74) *Attorney, Agent, or Firm* — Shichrur & Co.

(57) ABSTRACT

An active noise control (ANC) system may be implemented to both sides of a fan, such that both directions of the noise emitting are treated to reduce the overall noise. The impact on airflow is minimal, and the technique is very effective in a broad range of low frequencies. Passive sound-absorbing materials may be included for attenuation of high frequencies. The resulting quiet fan produces a low level of noise compared to any other device based on fan, which produces the same capacity of airflow. The quiet fan may be incorporated in any mechanical system which requires airflow induction such as: computers, air conditioners, machines, and more.

22 Claims, 6 Drawing Sheets

(56) References Cited

U.S. PATENT DOCUMENTS

| | | | |
|---|---|---|---|
| 4,025,724 | A | 5/1977 | Davidson, Jr. et al. |
| 4,665,549 | A | 5/1987 | Eriksson et al. |
| 4,965,832 | A | 10/1990 | Edwards et al. |
| 5,117,401 | A | 5/1992 | Feintuch |
| 5,182,774 | A | 1/1993 | Bourk |
| 5,216,722 | A * | 6/1993 | Popovich .................. 381/71.11 |
| 5,253,486 | A * | 10/1993 | Sugahara et al. ............... 62/296 |
| 5,271,062 | A | 12/1993 | Sugita et al. |
| 5,343,713 | A | 9/1994 | Okabe et al. |
| 5,347,586 | A | 9/1994 | Hill et al. |
| 5,365,594 | A | 11/1994 | Ross et al. |
| 5,377,275 | A | 12/1994 | Suzuki |
| 5,410,607 | A | 4/1995 | Mason et al. |
| 5,471,537 | A | 11/1995 | Castwall |
| 5,475,731 | A | 12/1995 | Rasmusson |
| 5,475,761 | A | 12/1995 | Eatwell |
| 5,478,199 | A * | 12/1995 | Gliebe ......................... 415/119 |
| 5,511,127 | A | 4/1996 | Warnaka |
| 5,519,637 | A | 5/1996 | Mathur |
| 5,553,154 | A | 9/1996 | Tamamura et al. |
| 5,568,557 | A * | 10/1996 | Ross et al. ................. 381/71.11 |
| 5,602,926 | A | 2/1997 | Ohashi et al. |
| 5,602,927 | A | 2/1997 | Tamamura et al. |
| 5,606,622 | A | 2/1997 | Christenson |
| 5,613,009 | A | 3/1997 | Miyazaki et al. |
| 5,618,010 | A | 4/1997 | Pla et al. |
| 5,627,896 | A | 5/1997 | Southward et al. |
| 5,636,286 | A | 6/1997 | Makabe et al. |
| 5,680,393 | A | 10/1997 | Bourmeyster et al. |
| 5,680,450 | A | 10/1997 | Dent et al. |
| 5,694,476 | A | 12/1997 | Klippel |
| 5,745,731 | A | 4/1998 | Kim et al. |
| 5,748,749 | A | 5/1998 | Miller et al. |
| 5,768,398 | A | 6/1998 | Janse et al. |
| 5,812,973 | A | 9/1998 | Wang |
| 5,978,489 | A | 11/1999 | Wan |
| 6,005,952 | A | 12/1999 | Klippel |
| 6,078,671 | A | 6/2000 | Kawanishi et al. |
| 6,084,971 | A | 7/2000 | McLean |
| 6,160,392 | A | 12/2000 | Shin |
| 6,160,892 | A | 12/2000 | Ver |
| 6,181,753 | B1 | 1/2001 | Takada et al. |
| 6,201,872 | B1 * | 3/2001 | Hersh et al. .................. 381/71.5 |
| 6,330,336 | B1 | 12/2001 | Kasama |
| 6,351,532 | B1 | 2/2002 | Takada et al. |
| 6,496,581 | B1 * | 12/2002 | Finn et al. ................ 379/406.01 |
| 6,535,609 | B1 | 3/2003 | Finn et al. |
| 6,700,977 | B2 * | 3/2004 | Sugiyama ................ 379/406.08 |
| 6,891,347 | B2 | 5/2005 | Dobbs et al. |
| 6,895,094 | B1 | 5/2005 | Scalart et al. |
| 6,944,304 | B1 | 9/2005 | Dance et al. |
| 7,017,702 | B2 | 3/2006 | Gunby |
| 7,017,707 | B2 | 3/2006 | Zia et al. |
| 7,161,801 | B2 | 1/2007 | Chen et al. |
| 7,167,363 | B1 | 1/2007 | Cushman et al. |
| 7,317,801 | B1 | 1/2008 | Amir |
| 7,353,908 | B1 | 4/2008 | French |
| 2002/0080978 | A1 | 6/2002 | Kakuhari et al. |
| 2002/0154481 | A1 | 10/2002 | Wagner |
| 2003/0053635 | A1 * | 3/2003 | Carme et al. .................. 381/71.5 |
| 2003/0103635 | A1 | 6/2003 | Wright et al. |
| 2003/0107873 | A1 | 6/2003 | Van Gaal |
| 2003/0112980 | A1 | 6/2003 | Vaishya |
| 2003/0123675 | A1 | 7/2003 | Culman et al. |
| 2005/0170770 | A1 | 8/2005 | Johnson et al. |
| 2005/0232435 | A1 * | 10/2005 | Stothers et al. ............ 381/71.11 |

FOREIGN PATENT DOCUMENTS

| | | |
|---|---|---|
| EP | 0818771 A2 | 1/1998 |
| EP | 0903726 A2 | 3/1999 |
| EP | 0973151 A2 | 1/2000 |
| EP | 1414021 | 4/2004 |
| WO | 9531805 A1 | 11/1995 |
| WO | 00/47012 | 8/2000 |
| WO | 02/32356 A1 | 4/2002 |
| WO | 2005/027338 | 3/2005 |

OTHER PUBLICATIONS http://en.wikibooks.org/wiki/Acoustics/Noise_from_Cooling_Fans.

International Search Report for PCT/IL07/00269 mailed on Sep. 22, 2008.

International Search Report for PCT/IL07/00270 mailed on Sep. 16, 2008.

Search Report of EP 02 02 3483 mailed on Apr. 8, 2003.

Office Action for EP 0202 3483 mailed on Jan. 31, 2005.

Office Action for EP 0202 3483 mailed on Apr. 11, 2005.

Office Action for EP 0202 3483 mailed on Jul. 27, 2006.

Search Report for PCT/IL04/00863 mailed on Feb. 25, 2005.

Search Report for PCT/IL08/00087 mailed on Sep. 23, 2008.

European Search Report for European Patent Application No. 07713290.0, mailed on Feb. 28, 2013, 8 pages.

Office Action for U.S. Appl. No. 10/573,060, mailed on Oct. 2, 2008, 16 pages.

Office Action for U.S. Appl. No. 10/573,060, mailed on Apr. 30, 2009, 17 pages.

Office Action for U.S. Appl. No. 10/573,060, mailed on Sep. 4, 2009, 19 pages.

Office Action for U.S. Appl. No. 10/573,060, mailed on Feb. 4, 2010, 22 pages.

Office Action for Korean Patent Application No. 10-2006-7007389, mailed on Feb. 24, 2011, 10 pages, including 4 pages of English translation.

Office Action for U.S. Appl. No. 09/120,973, mailed on Jul. 17, 2003, 10 pages.

Office Action for U.S. Appl. No. 09/120,973, mailed on Sep. 12, 2003, 8 pages.

Office Action for U.S. Appl. No. 09/120,973, mailed on Mar. 24, 2004, 7 pages.

Office Action for U.S. Appl. No. 09/120,973, mailed on Jul. 12, 2004, 8 pages.

Office Action for U.S. Appl. No. 09/120,973, mailed on Dec. 16, 2004, 9 pages.

Office Action for U.S. Appl. No. 09/120,973, mailed on Dec. 15, 2005, 7 pages.

Office Action for U.S. Appl. No. 11/606,010, mailed on Nov. 24, 2009, 23 pages.

Office Action for U.S. Appl. No. 11/606,010, mailed on Sep. 17, 2008, 20 pages.

Office Action for U.S. Appl. No. 11/606,010, mailed on Jul. 7, 2009, 25 pages.

Office Action for U.S. Appl. No. 11/606,010, mailed on Apr. 1, 2009, 22 pages.

Office Action for U.S. Appl. No. 12/941,145, mailed on Nov. 13, 2012, 6 pages.

Office Action for U.S. Appl. No. 12/941,145, mailed on Mar. 25, 2013, 6 pages.

Office Action for U.S. Appl. No. 12/941,145, mailed on Jul. 1, 2013, 12 pages.

International Preliminary Report on Patentability for International Application No. PCT/IL2008/000087, mailed on Sep. 23, 2008, 9 pages.

* cited by examiner

QUIET FAN INCORPORATING ACTIVE NOISE CONTROL (ANC)

CROSS-REFERENCE(S) TO RELATED APPLICATIONS(S)

This Application is a United States National Phase of PCT International Application Number PCT/IL2008/000087, filed on Jan. 20, 2008, published on Jul. 31, 2008 as International Publication Number WO 2008/090544, which is hereby incorporated by reference in its entirety; which in turn claims priority and benefit of U.S. provisional application No. 60/881,518, filed on Jan. 22, 2007, which is hereby incorporated by reference in its entirety.

TECHNICAL FIELD

The disclosure relates to techniques for reducing noise, such as by active noise control (ANC) for noise sources, such as air-moving devices, particularly fans and blowers.

BACKGROUND

Active noise control (ANC) (also known as noise cancellation, active noise reduction (ANR) or antinoise) is a method for reducing unwanted sound.

The basic elements of an active noise control system include one or more microphones to sense the noise over some location of interest and a means to produce an appropriately tailored sound field that acts as a "control field." The control field is usually created through the action of a control system connected to loudspeakers. Applications of the concept have included control of noise produced by industrial fans, suppression of noise in heating, ventilation, and air conditioning ducts, reduction of vehicle exhaust sounds, creation of "quiet zones" within vehicle interiors, reduction of the noise levels inside aircraft and spacecraft launch fairings, and the now almost commonplace active noise control headsets in aviation and consumer use.

Active noise control dates back to 1934. U.S. Pat. No. 2,043,416, incorporated by reference herein, describes a process of silencing sound oscillations by receiving sound oscillations which are to be silenced, and reproducing them in the form of sounds having an opposite phase.

Sound is a pressure wave, which consists of a compression phase and a rarefaction phase. A noise-cancellation speaker emits a sound wave with the same amplitude and the opposite polarity (in antiphase) to the original sound. The waves combine to form a new wave, in a process called interference, and effectively cancel each other out—an effect which is called phase cancellation. Depending on the circumstances and the method used, the resulting soundwave may be so faint as to be inaudible to human ears.

The human ear can nominally hear sounds in the range 20 Hz to 20,000 Hz (20 kHz). This upper limit tends to decrease with age, most adults being unable to hear above 16 kHz. The ear itself does not usually respond to frequencies below 20 Hz, but these can be perceived via the body's sense of touch. The "intensity" range of audible sounds is enormous. Human ear drums are reportedly sensitive only to the sound pressure variation. The lower limit of audibility is defined as 0 dB (decibels), but the upper limit is not as clearly defined. The upper limit is more a question of the limit where the ear will be physically harmed or with the potential to cause a hearing disability. This limit depends also on the time of exposure to the sound. The human ear can be exposed to short periods in excess of 120 dB without permanent harm—albeit with discomfort and possibly pain; but long term exposure to sound levels over 80 dB can cause permanent hearing loss.

Noise at all, and tonal noise in particular is very annoying. In many cases, the noise level may collide with safeness standards and in radical situations may harm health.

Noise can be classified into several categories related to its spectrum shape, namely the distribution of the acoustic energy over the audible frequency range (which is typically 20-20,000 Hz).

A "tonal" noise is noise with its energy concentrated at a few specific frequencies. A whistle is a radical example for a tonal noise in which the acoustic energy concentrates at a single frequency, producing a single tone noise. Complex products containing several types of fans and/or engines which usually produce a significant whistle may produce tonal noise in which the acoustic energy concentrates at several separable frequencies.

A "broadband" noise is noise with its energy spread over a range of frequencies, but not necessarily the whole audible range (20-20,000 Hz). An air-conditioner noise is an example of a broadband noise in which its energy spreads on the range of 100-1500 Hz. Air-flow at-all is a typical example of a broadband noise.

In most cases, the spectrum of the noise contains a tonal noise and a broadband noise, when in a spectrum curve the tonal noise peaks protrude above the broadband noise spectrum curve. A noise measured within a car is a typical example of such a noise including tonal and broadband ingredients.

A noise-cancellation speaker may be co-located with the sound source to be attenuated. In this case it must have the same audio power level as the source of the unwanted sound. Alternatively, the transducer emitting the cancellation signal may be located at the location where sound attenuation is wanted (for example, the user's ear). This requires a much lower power level for cancellation but is effective only for a single user. Noise cancellation at other locations is more difficult as the three dimensional wavefronts of the unwanted sound and the cancellation signal could match and create alternating zones of constructive and destructive interference. In small enclosed spaces (for example, the passenger compartment of a car) such global cancellation can be achieved via multiple speakers and feedback microphones, and measurement of the modal responses of the enclosure.

Modern active noise control is achieved through the use of a computer, which analyzes the waveform of the background aural or nonaural noise, then generates a polarization reversed waveform to cancel it out by interference. This waveform has identical or directly proportional amplitude to the waveform of the original noise, but its polarity is reversed. This creates the destructive interference that reduces the amplitude of the perceived noise.

ANC methods differ from passive noise control methods (soundproofing) in that a powered system is involved, rather than unpowered methods such as insulation, sound-absorbing ceiling tiles or muffler.

Sound absorption materials for use in passive noise control may range from mineral wool and glass fiber blankets to open cell foams made of polyurethane, polyimide and melamine, having a variety of surface treatments. The effectiveness of all these materials in acting as sound absorbers or isolators tends to be highly frequency dependent.

Regarding passive noise control, generally, elastic porous materials such as polyurethane foam reduce noise by dissipating the energy of the incident sound wave, using the friction related to the coupling of the solid constituting the frame and the fluid (air) in the holes. The method of passive noise control using the elastic porous material is the method to absorb sounds merely by installing the elastic porous material between the noise origin and the sound receipt point. This method is simple in structure and easy to implement. Thus, this method has been widely used because of the low cost incurred in installing the device and the broad frequency bandwidth in which noise may be reduced. However, this method has a drawback in that it can hardly control noises of low frequencies.

Generally, passive noise control methods, such as foam, are most effective above a frequency such as 1000 Hertz (1 KHz). And active noise control methods are most effective at lower frequencies.

The passive means, which are in use in current products, are not efficient in the low frequencies and particularly when dealing with fan noise in which one should not block or impair the airflow. The noise emitted by standard fans in routine use is characterized by one or several tones at the low frequencies range (<1000 Hz). These tones generally cannot be reduced by means of passive treatment under limitation of weight and size. For example, in order to reduce a tone at 500 Hz in about 10 dBA would expectedly require the use of a muffler of more than 1 meter length and 30 cm diameter. Active noise control technology is designed to overcome this disadvantage, and may commonly achieve 25 dBA reduction of separated tones, and 10 dBA in a range of frequencies noise.

Exemplary ANC Systems

A basic feed-forward active noise control system generally consists of a reference sensor (such as a microphone), an electronic controller, a loudspeaker and an error sensor (such as a microphone). The reference microphone picks up the information of the primary noise field and sends it to the electronic controller; the controller then drives the control loudspeaker to radiate the antinoise; the error microphone examines the control performance and modulates the controller for the best result.

An example of an active noise control system and method may be found in commonly-owned Patent Publication No. WO 2005/027338 ("338"), incorporated by reference herein. As shown and described therein, an active noise control (ANC) system may include an acoustic sensor (typically a microphone) to sense the noise energy and/or wave amplitude of a noise pattern produced by a noise source. The ANC system may also include an acoustic transducer (for example a speaker), and a controller to control the speaker to produce a noise destructive pattern to reduce or cancel the noise energy and/or wave amplitude of the noise pattern, for example within a reduced-noise zone. The controller may include an estimator to produce a predicted noise signal by applying an estimation function to one or more samples of noise signal. A noise error signal may be sensed by a second acoustic sensor (error microphone) positioned in the reduced-noise zone.

Digital adaptive reduction of noise in the time domain is typically performed by sampling the analog output of a microphone that is appropriately positioned to sense the input noise. The sampled analog noise is then converted to digital format via an A/D (analog-to-digital) converter, passed through an adaptive digital filter and then converted back to analog via a D/A (digital-to-analog) converter before being output to a speaker. The analog output of a microphone is utilized as the input to the internal adaptive algorithm within the prior art noise reduction system.

A method of noise cancellation used in prior art systems places the microphone as close to the noise source as possible and the loudspeaker relatively far from the microphone so as to create a delay equal to the time for the noise to travel from the microphone to the speaker. This delay is intentionally created in order to match the internal signal processing time of the noise reduction system. The propagation time for the noise is configured to roughly match and compensate for the signal propagation time within the noise reduction system. This noise reduction method is particularly useful for cancellation of noise in a duct such as an air conditioning duct. The internal signal processing is performed during the time that it takes for the sound waves to travel from the microphone to the loudspeaker.

Virtual Microphone

It is understood to generate what is referred to as a "virtual microphone" to eliminate the need for a second "error microphone". The technique is based on a previously measured acoustic transfer function between an existing microphone, usually the reference microphone, a microphone, the virtual microphone, temporarily placed at a position further away from the existing one and the speaker input. Applying the transfer function between the reference microphone and the virtual microphone to the reference microphone signal, yields an estimation of the source noise at the virtual microphone location. Applying the transfer function between the speaker input and the virtual microphone to the speaker input signal, yields an estimation of the destruction signal at the virtual microphone location. Summing up (adding together) the two estimated signals yields an estimation of the error signal or the residual noise.

Types of Fans

A fan is an example of a device used to induce airflow and is generally made from broad, flat surfaces which revolve or oscillate. There are three main types of fans used for moving air: axial fan (see FIGS. 1A and 1B), centrifugal fan also called radial fan (see FIG. 2) and cross flow fan also called tangential fan (see FIG. 3). Axial (or axial-flow) fans have blades that force air to move parallel to a mandrill (or axle) about which the blades rotate. Axial fans blow air across the axis of the fan, linearly, hence their name. The centrifugal fan has a moving component (called an impeller) that consists of a central shaft about which a set of blades form a spiral pattern. Centrifugal fans blow air at right angles to the intake of the fan and spin (centrifugally) the air outwards to the outlet. Tangential fans take in air along the periphery of the rotor and expel it through the outlet in a similar fashion to the centrifugal fan. Cross-flow fans give off an even airflow along the entire width of the fan, and are very quiet in operation. They are comparatively bulky, and the air pressure is low.

FIGS. 1A and 1B illustrate an axial-flow fan having an impeller comprising a plurality of vanes (or blades). The vanes extend radially from a hub, and are all generally in a plane. The fan has a circular housing. A motor may be connected to the hub for rotating the hub, hence the vanes, about an axis. When the vanes are rotating, air flows generally parallel to the axis, from an inlet side of the fan, axially, through the vanes, to an outlet side of the fan, where the flow is also axial, substantially collinear with the inlet flow. The fan may alternatively have a square-shaped housing, as indicated by the dashed lines in FIG. 1A, may be a "muffin fan", and may alternatively have the motor incorporated into the hub (not shown).

FIG. 2 illustrates a centrifugal flow fan having an impeller comprising a plurality of vanes (or blades). The vanes extend generally axially at a radial distance from an axis of rotation, and there is an open space inside the vanes. The fan has a generally spiral shaped housing. A motor may be connected to the impeller for rotating the vanes, about the axis. When the vanes are rotating, air flows from an inlet side of the fan, generally axially to a space inside the vanes, through the vanes, to an outlet side of the fan where the flow is more-or-less radial, at approximately 90 degrees to the inlet flow.

FIG. 3 illustrates a tangential flow fan having an impeller comprising a plurality of vanes (or blades). The vanes extend generally axially at a radial distance from an axis of rotation, similar to the centrifugal fan, but are generally longer than the vanes of the centrifugal fan, and there is not the open space inside the vanes that there is in the centrifugal fan. The fan has a generally spiral shaped housing. A right (as viewed) end of the housing is shown broken away, to better see the impeller and vanes. A motor (not shown) may be connected to the impeller for rotating the vanes, about the axis. When the vanes are rotating, air flows from an inlet side of the fan, radially, through the vanes, to an outlet side of the fan where the flow is also radial at approximately 90 degrees to the inlet flow.

Noise Concerns

An undesirable side effect of the induced airflow is annoying noise which stems from the mechanical friction of the fan components such as the fan motor, the rotor mandrill and the friction between the blades and the air, and also from the air movement. Since the shell of the fan has some sort of noise obstruction capabilities, and since in all kinds of fans, the airflow is directional in the intake as well as in the outtake, a fan can be regarded as a bi-directional noise source in which the two major noise sources are the inlet (intake) and the outlet (outtake, exhaust).

The standard "JIS B 8330" (Testing Methods for Turbo-Fans, Japanese Standards Association, Publication Date: Jul. 20, 2000) is commonly used as a guideline for fan noise measurements. However, due to these standard and other common measurements methods, the fan noise is measured in a so-called free field, in which no load is acting on the fan. The measurements result is a parameter that usually is published in a dedicated column in the fan specifications.

In most applications, the fan is not applied as a stand-alone device, and is usually coupled with another mechanical device such as a heat sink, duct or radiator, that imposes a significant load on the fan and may significantly increase the fan noise. And, once installation effects are taken into account, then the actual levels will typically exceed the free field ones, due to reflections off adjacent surfaces, such as floors and walls. Actual installations will be somewhere between a free field and reverberant environments.

Traditional Solutions

Traditional methods to ease the acoustic problem such as mufflers, sealing or absorbing materials may appear to be ineffectual since the nature of the fan as an airflow generator compels at least one direct contact between the fan core and the ambience. As noise is better travel through air the noise can be emitted through this direct contact, which eliminates the sealing solution or other solutions based on blocking the noise by acoustic barriers.

Mufflers or silencers are not effective also since mufflers usually contain a series of baffles to absorb sound, although the majority of the noise reduction is not through absorption but through destructive interference in the muffler itself. The muffler accomplishes this with a resonating chamber, which is specifically designed such that opposite sound waves are likely to collide, canceling each other out. The set of baffles and chambers presents a significant resistance to air, and may reduce airflow such that the original goal of the fan can not be achieved.

Absorbing materials may be a partial solution only since in most fans with dimensions exceeding 60×60 mm, the dominant noise frequencies are below 1 kHz, in which the absorbing materials are almost useless.

Feed-Forward And Feedback Systems

Feed-forward is a term describing a kind of system which reacts to changes in its environment, usually to maintain some desired state of the system. A system which exhibits feed-forward behavior responds to a measured disturbance in a pre-defined way, as contrasted with a feedback system.

Many prerequisites are needed to implement a feed-forward control scheme: the disturbance must be measurable, the effect of the disturbance to the output of the system must be known, and the time it takes for the disturbance to affect the output must be longer than the time it takes the feed-forward controller to affect the output. If these conditions are met, feed-forward can be tuned to be extremely effective.

Feed-forward control can respond more quickly to known and measurable kinds of disturbances, but cannot do much with novel disturbances. Feedback control deals with any deviation from desired system behavior, but requires the system's measured variable (output) to react to the disturbance in order to notice the deviation.

A feed-forward system can be illustrated by comparing it with a familiar feedback system—that of cruise control in a car. When in use, the cruise control enables a car to maintain a steady road speed. When an uphill stretch of road is encountered, the car slows down below the set speed; this speed error causes the engine throttle to be opened further, bringing the car back to its original speed.

A feed-forward system on the other hand would in some way 'predict' the slowing down of the car. For example it could measure the slope of the road and, upon encountering a hill, would open up the throttle by a certain amount, anticipating the extra load. The car does not have to slow down at all for the correction to come into play.

Sound Power Level

Sound Power and Sound Pressure are two distinct and commonly confused characteristics of sound. Both share the same unit of measure, the decibel (dB), and the term "sound level" is commonly substituted for each. Sound power is the acoustical energy emitted by the sound source, and is an absolute value—the environment does not affect it. Sound power levels are connected to the sound source and independent of distance of measurements.

| Sound Power | Sound Pressure |
| --- | --- |
| Sound Power is the amount of acoustic energy being generated per unit time by the source. | Sound Pressure is the pressure deviation from the local ambient pressure caused by a sound wave. |
| Sound Power cannot be measured directly. | Sound Pressure can be measured with a microphone. |
| Sound Power is not affected by the environment. | Sound Pressure is affected by the environment. |

$$L_p = L_W + 10 \log [(D/4\Pi r^2) + (4/R)] \Pi$$

where $L_p$ is the Sound Pressure level in dB $L_W$ is the Sound Power level in dB D is the directivity factor $\Pi$ is "pi" (3.14)

R is the environment constant in $m^2$ sabins r is the radius of the measurements Loudspeakers (Speakers)

Conventional loudspeakers, independent of the method of transduction they use (electromagnetic, electrostatic, piezoelectric), aim at achieving pistonic motion of the diaphragm. "Pistonic" movement means a displacement of the diaphragm as a rigid whole. In acoustic terms, such a loudspeaker is mass-controlled. For a given input voltage the motor generates a force that is constant with frequency, the diaphragm resists with its mass according to Newton's second law of motion. To avoid acoustical shortcut between the front and backside of the diaphragm the loudspeaker benefits from an enclosure. For powerful sound radiation the volume has to be huge in order to minimize the pressure differential within the enclosure while the diaphragm is displaced. Additionally, the huge cavity may lead to additional problems with resonances.

Another kind of sound source uses pneumatic energy as the actuator. Ships' sirens, for instance, with rotating interrupter disks are ideally suited to the reproduction of loud and far-reaching sound mixtures, but only for repetitive signals. Then there are also 'air-modulated devices'. In these, a compressed air stream is modulated through an electrodynamically actuated valve.

Whereas a conventional loudspeaker functions with large membrane areas and small vibration amplitudes, with pumps the same volume flow and therefore the same acoustic emissions can be achieved, but with a very much smaller sound radiating opening area. The Air Pump Speaker uses micro- and nanomechanical pumps for air, gas or fluids. Thanks to their small dimensions, these pump systems have very short reaction times and are therefore capable of delivering the output flow necessary for generating a powerful sound signal. See, for example, Patent Publication No. WO 00/47012, sound generator with a pump actuator, incorporated by reference herein.

GLOSSARY

Unless otherwise noted, or as may be evident from the context of their usage, any terms, abbreviations, acronyms or scientific symbols and notations used herein are to be given their ordinary meaning in the technical discipline to which the disclosure most nearly pertains. The following terms, abbreviations and acronyms may be used throughout the descriptions presented herein and should generally be given the following meaning unless contradicted or elaborated upon by other descriptions set forth herein. Some of the terms set forth below may be registered trademarks (®).

When glossary terms (such as abbreviations) are used in the description, no distinction should be made between the use of capital (uppercase) and lowercase letters. For example "ABC", "abc" and "Abc", or any other combination of upper and lower case letters with these 3 letters in the same order, should be considered to have the same meaning as one another, unless indicated or explicitly stated to be otherwise. The same commonality generally applies to glossary terms (such as abbreviations) which include subscripts, which may appear with or without subscripts, such as "$X_{yz}$" and "Xyz". Additionally, plurals of glossary terms may or may not include an apostrophe before the final "s"—for example, ABCs or ABC's.

ANC Short for active noise control. ANC is achieved by introducing a canceling "antinoise" wave through an appropriate array of secondary sources. These secondary sources are interconnected through an electronic system using a specific signal processing algorithm for the particular cancellation scheme. ANC is an effective way to attenuate noise that is very difficult and expensive to control using passive means. It has application to a wide variety of problems in manufacturing, industrial operations, and consumer products. See, for example U.S. Pat. No. 5,377,275, incorporated by reference herein in its entirety.

codec short for coder-decoder, or compressor-decompressor, or compression-decompression algorithm. A codec is a device or program capable of performing encoding and decoding on a digital data stream or signal.

dB short for decibel. The decibel (dB) is a measure of the ratio between two quantities, and is used in a wide variety of measurements in acoustics, physics and electronics. While originally only used for power and intensity ratios, it has come to be used more generally in engineering. The decibel is widely used in measurements of the loudness of sound. The decibel unit is commonly used in acoustics to quantify sound levels relative to some 0 dB reference.

dBA short for decibels adjusted. Weighted absolute noise power, calculated in dB referenced to 3.16 picowatts (−85 dBm), which is 0 dBA.

DSP short for digital signal processor. A DSP is a specialized microprocessor designed specifically for digital signal processing, generally in real-time computing.

frequency Frequency is a measure of the number of occurrences of a repeating event per unit time. For sound, frequency is typically measured in cycles per second, or Hertz. Frequency has an inverse relationship to the concept of wavelength, simply, frequency is inversely proportional to wavelength $\lambda$. The frequency f is equal to the speed v of the wave divided by the wavelength $\lambda$ (lambda) of the wave. The speed of sound in air is approximately 344 m/s (meters per second), or 770 mph (miles per hour). Thus, for example, sound having a frequency of 1000 Hertz has a wavelength of approximately one third of a meter, or approximately one foot.

microphone A microphone, sometimes referred to as a "mike" or "mic", is an acoustic to electric transducer or sensor that converts sound into an electrical signal. As used herein, sound is a vibration in air pressure, and that vibration is manifested (represented) in the resulting electrical signal.

noise In common use the word noise means unwanted sound or noise pollution. Noise is an unwanted sound; its intensity ('loudness') is measured in decibels (dB). The decibel scale is logarithmic, so a three-decibel increase in the sound level already represents a doubling of the noise intensity. For example, a normal conversation may be about 65 dB and someone shouting typically can be around 80 dB. The difference is only 15 dB but the shouting is 30 times as intensive. To take into account the fact that the human ear has different sensitivities to different frequencies, the strength or intensity of noise is usually measured in A-weighted decibels (dB(A)).

In electronics noise can refer to the electronic signal corresponding to acoustic noise (in an audio system) or the electronic signal corresponding to the (visual) noise commonly seen as 'snow' on a degraded television or video image. In signal processing or computing it can be considered data without meaning; that is, data that is not being used to transmit a signal, but is simply produced as an unwanted by-product of other activities. In Information Theory, however, noise is still considered to be information. In a broader sense, film grain or even advertisements in web pages can be considered noise.

Noise can block, distort, or change the meaning of a message in both human and electronic communication.

When speaking of noise in relation to sound, what is commonly meant is meaningless sound of greater than usual volume. Thus, a loud activity may be referred to as noisy. However, conversations of other people may be called noise for people not involved in any of them, and noise can be any unwanted sound such as the noise of aircraft, neighbors playing loud music, or road sounds spoiling the quiet of the countryside.

Sabins The Sabin is defined as a unit of sound absorption. One square meter of 100% absorbing material has a value of one metric Sabin. The unit is named in honor of Wallace Clement Sabine. The total adsorption in sabins can be calculated by:

$$A = S1\alpha1 + S2\alpha2 + \ldots + Sn\alpha n = \Sigma Si\alpha i$$

where
A=the absorption of the room (m2 sabine)
Sn=area of the actual surface (m2)
αn=absorption coefficient of the actual surface sound Sound is generally known as vibrational transmission of mechanical energy that propagates through matter as a wave that can be audibly perceived by a living organism through its sense of hearing. For humans, hearing is limited to frequencies between about 20 Hz and 20000 Hz, with the lower limit generally decreasing with age. Other species have a different range of hearing. For example, dogs can perceive vibrations higher than 20 kHz.

Sound is further characterized by the generic properties of waves, which are frequency, wavelength, period, amplitude, speed, and direction (sometimes speed and direction are combined as a velocity vector, or wavelength and direction are combined as a wave vector).

The mechanical vibrations that can be interpreted as sound can travel through all forms of matter, gases, liquids, solids, and plasmas. However, sound cannot propagate through vacuum. The matter that supports the sound is called the medium. Sound propagates as waves of alternating pressure deviations from the equilibrium pressure (or, for transverse waves in solids, as waves of alternating shear stress), causing local regions of compression and rarefaction. Matter in the medium is periodically displaced by the wave, and thus oscillates. The energy carried by the sound wave is split equally between the potential energy of the extra compression of the matter and the kinetic energy of the oscillations of the medium. The scientific study of the propagation, absorption, and reflection of sound waves is called acoustics.

Noise is often used to refer to an unwanted sound. In science and engineering, noise is an undesirable component that obscures a wanted signal.

speaker A loudspeaker, speaker, or speaker system is an electromechanical transducer that converts an electrical signal into sound. The term loudspeaker can refer to individual devices (or drivers), or to complete systems consisting of an enclosure incorporating one or more drivers and additional electronics. The most common type of driver (what is normally referred to as the "speaker") uses a lightweight diaphragm connected to a rigid basket, or frame, via flexible suspension which constrains a coil ("voice coil") of fine wire to move axially through a cylindrical magnetic gap. When an electrical signal is applied to the voice coil, a magnetic field is created by the electric current in the coil which thus becomes an electromagnet. The coil and the driver's magnetic system interact, generating a mechanical force which causes the coil, and so the attached cone, to move back and forth, and so reproduce sound under the control of the applied electrical signal coming from the amplifier by moving air and creating sound vibrations in response to the applied electrical signal.

BRIEF DESCRIPTION

Summary

It is an object of the disclosure to provide improved techniques for quieting noise-generating devices, particularly airflow devices, more particularly fans.

According to the disclosure, generally, an ANC system is provided in a duct extending from the inlet side of an air-moving device, and a second ANC system is provided in a duct extending from the outlet side of the air-moving device.

According to an embodiment of the disclosure, a quiet fan comprises: an air-moving device having an inlet side and an outlet side; a first active noise control (ANC) system disposed on the inlet side; and a second active noise control (ANC) system disposed on the outlet side. An inlet duct may extend from the inlet side of the air-moving device; and an outlet duct may extend from the outlet side of the air-moving device. The first ANC system may be associated with the inlet duct; and the second ANC system may be associated with the outlet duct.

The first ANC system may comprise a first microphone disposed within the inlet duct; and the second ANC system may comprise a second microphone disposed within the outlet duct. The first ANC system may comprise a first speaker disposed to generate anti-noise to interact with noise being propagated in the air passing through the inlet duct; and the second ANC system may comprise a second speaker disposed to generate anti-noise to interact with noise being propagated in the air passing through the inlet duct. The first speaker may be disposed in a first speaker chamber; and the second speaker may be disposed in a second speaker chamber. The first speaker chamber may be adjacent the inlet duct; and the second speaker chamber may be adjacent to the outlet duct.

According to an embodiment of the disclosure, there is provided an active noise control (ANC) system comprising: a first ANC sub-unit adapted to be disposed on an inlet side of an air-moving device; and a second ANC sub-unit adapted to be disposed on an outlet side of the air-moving device.

The first ANC sub-unit may include at least one of a first microphone (Mic-1) and a first speaker (Spk-1), wherein the first speaker (Spk-1) is adapted to generate anti-noise to interact with noise being propagated in the air passing through the inlet.

The first ANC sub-unit may include a first controller (controller 1) adapted to control at least an output signal of the first ANC sub-unit.

The second ANC sub-unit may include at least one of a second microphone (Mic-2) and a second speaker (Spk-2), wherein the second speaker (Spk-2) is adapted to generate anti-noise to interact with noise being propagated in the air passing through the outlet.

The second ANC sub-unit may include a second controller (controller 2) adapted to control at least an output signal of the second ANC sub-unit.

The ANC system may be adapted to reduce cross echo between a second speaker (Spk-2) disposed within the second ANC sub-unit and a first microphone (Mic-1) disposed within the first ANC sub-unit.

The ANC system may be adapted to reduce cross echo between a first speaker (Spk-1) disposed within the first ANC sub-unit and a second microphone (Mic-2) disposed within the second ANC sub-unit.

The ANC system may further include a first digital filter (EC1) adapted to produce a first signal indicative of an echo produced between a first speaker (Spk-1) disposed within the first ANC sub-unit and a first microphone (Mic-1) disposed within the first ANC sub-unit; and a first controller (Controller 1), wherein the first signal is adapted to be subtracted from a signal from the first microphone (Mic-1) before the signal from the first microphone (Mic-1) is provided to the first controller (Controller 1).

The ANC system may further include a second digital filter (EC2) adapted to produce a second signal indicative of an echo produced between a second speaker (Spk-2) disposed within the second ANC sub-unit and a first microphone (Mic-1) disposed within the first ANC sub-unit; and a first controller (Controller 1), wherein the second signal is adapted to be subtracted from a signal from the first microphone (Mic-1) before the signal from the first microphone (Mic-1) is provided to the first controller (Controller 1).

The ANC system may further include a first digital filter (EC1) adapted to produce a first signal indicative of an echo produced between a first speaker (Spk-1) disposed within the first ANC sub-unit and a first microphone (Mic-1) disposed within the first ANC sub-unit; and a second digital filter (EC2) adapted to produce a second signal indicative of an echo produced between a second speaker (Spk-2) disposed within the second ANC sub-unit and a first microphone (Mic-1) disposed within the first ANC sub-unit; and a first controller (Controller 1), wherein the first signal and the second signal are adapted to be subtracted from a signal from the first microphone (Mic-1) before the signal from the first microphone (Mic-1) is provided to the first controller (Controller 1).

The ANC system may further include a third digital filter (EC3) adapted to produce a third signal indicative of an echo produced between a first speaker (Spk-1) disposed within the first ANC sub-unit and a second microphone (Mic-2) disposed within the second ANC subunit; and a second controller (Controller 2), wherein the third signal is adapted to be subtracted from a signal from the second microphone (Mic-2) before the signal from the second microphone (Mic-2) is provided to the second controller (Controller 2).

The ANC system may further include a fourth digital filter (EC4) adapted to produce a forth signal indicative of an echo produced between a second speaker (Spk-2) disposed within the second ANC sub-unit and a second microphone (Mic-2) disposed within the second ANC sub-unit; and a second controller (Controller 2), wherein the forth signal is adapted to be subtracted from a signal from the second microphone (Mic-2) before the signal from the second microphone (Mic-2) is provided to the second controller (Controller 2).

The ANC system may further include a third digital filter (EC3) adapted to produce a third signal indicative of an echo produced between a first speaker (Spk-1) disposed within the first ANC sub-unit and a second microphone (Mic-2) disposed within the second ANC sub-unit; and a forth digital filter (EC4) adapted to produce a forth signal indicative of an echo produced between a second speaker (Spk-2) disposed within the second ANC sub-unit and a second microphone (Mic-2) disposed within the second ANC sub-unit; and a second controller (Controller 2), wherein the third signal and the forth signal are adapted to be subtracted from a signal from the second microphone (Mic-2) before the signal from the second microphone (Mic-2) is provided to the second controller (Controller 2).

According to an embodiment of the disclosure, there is provided a rack comprising at least one active noise control (ANC) system, the at least one active noise control (ANC) system comprises a first ANC sub-unit adapted to be disposed on an inlet side of an air-moving device; and a second ANC sub-unit adapted to be disposed on an outlet side of the air-moving device.

The air-moving device may be a fan. The fan may be selected from the group consisting of axial fan, tangential fan and centrifugal fan.

According to an embodiment of the disclosure, a method of implementing noise control for a fan comprises: providing a first active noise control (ANC) system on an inlet side of the fan; and providing a second active noise control (ANC) system on an outlet side of the fan. The first ANC system may comprise a first microphone (Mic-1), a first speaker (Spk-1), and a first controller (Controller 1); and the second ANC system may comprise a second microphone (Mic-2), a second speaker (Spk-2), and a second controller (Controller 2).

A first direct echo path ("A") may exist between the second speaker (Spk-2) and the second microphone (Mic-2); a second direct echo path ("B") may exist between the first speaker (Spk-1) and the first microphone (Mic-1); a first cross-echo path ("C") may exist between the second speaker (Spk-2) and the first microphone (Mic-1); and a second cross-echo path ("D") may exist between the first speaker (Spk-1) and the second microphone (Mic-2).

An interlaced algorithm may be used to reduce cross-echo.

The method may comprise: providing a first digital filter (EC1) to represent a feedback path which comprises the first direct echo path "A" between the first speaker (Spk-1) and the first microphone (Mic-1); driving the first digital filter (EC1) by a signal that is sent to the first speaker (Spk-1) by the first controller (Controller 1); providing a second digital filter (EC2) to represent a feedback path which comprises the first cross-echo path "C" between the second speaker (Spk-2) and the first microphone (Mic-1); driving the second digital filter (EC2) by a signal that is sent to the second speaker (Spk-2) by the second controller (Controller 2); and subtracting outputs of the first and second digital filters from a signal from the first microphone (Mic-1) before the signal from the first microphone (Mic-1) is provided to the first controller (Controller 1).

The method may further comprise: providing a third digital filter (EC1') to represent a feedback path which comprises the second direct echo path "B" between the second speaker (Spk-2) and the second microphone (Mic-2); driving the third digital filter (EC1') by a signal that is sent to the second speaker (Spk-2) by the second controller (Controller 2); providing a fourth digital filter (EC2') to represent a feedback path which comprises the second cross-echo path "D" between the first speaker (Spk-1) and the second microphone (Mic-2); driving the fourth digital filter (EC2') by a signal that is sent to the first speaker (Spk-1) by the first controller (Controller 1); and subtracting outputs of the first and second digital filters from a signal from the second microphone (Mic-2) before the signal from the second microphone (Mic-2) is provided to the second controller (Controller 2).

The first and second controllers may be two channels of a dual-channel controller.

The techniques (methods and apparatuses) disclosed herein may broadly be referred to as "Quiet Fan". The Quiet Fan may be used in any mechanical system which requires airflow induction such as: computers, air conditioners, machines, and more. Some applications for the Quiet Fan may include:

IT Market:

Computer chassis: most of the IT products such as desktop computers, servers, rack mounted servers, etc. are typically forced air-cooled, or in other words, includes one or more air-moving device such as axial fan, tangential fan, centrifugal fan and more. This air-moving device produces a significant noise that bothers the customer and in many cases exceeds the applicable noise level standards.

Racks: Racks are cabinets in which rack-mounted servers are installed. In recent years, acoustic racks have become more and more prevalent. Noise emitting from racks disturb the customers, where it is located close to work areas like in SOHOs (Small Office, Home Office). Acoustic racks may be passive only without any kind of airflow impeller, and may include air-moving devices. Unfortunately, adding noisy fans to the acoustic racks may offset its acoustic advantages.

Machinery:

Many types of industrial machines use air-moving devices for cooling purposes. As safety standards impose particular constraints on noise levels at working areas, the noise emitted by these air-moving devices becomes a significant issue.

HVAC:

Air exchangers, air-conditioners, car HVACs, vents, etc., are all based on air-moving devices to produce airflow. Caring of customers' complaints, using a quiet air-moving devise may help manufacturers to offer quieter products.

Appliances:

Like HVACs, appliances like driers, refrigerators, cooker hoods, etc., are mostly based on air-moving devices to produce airflow. The home environment makes noisy devices unacceptable, and encourages use of quiet air-moving devices.

BRIEF DESCRIPTION OF THE DRAWING(S)

Reference will be made in detail to embodiments of the disclosure, examples of which may be illustrated in the accompanying drawing figures (FIGs). The figures are intended to be illustrative, not limiting. Although the disclosure is generally described in the context of these embodiments, it should be understood that it is not intended to limit the disclosure to these particular embodiments.

Certain elements in selected ones of the figures may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity. In some cases, hidden lines may be drawn as dashed lines (this is conventional), but in other cases they may be drawn as solid lines.

If shading or cross-hatching is used, it is intended to be of use in distinguishing one element from another (such as a cross-hatched element from a neighboring un-shaded element. It should be understood that it is not intended to limit the disclosure due to shading or cross-hatching in the drawing figures.

Elements of the figures may (or may not) be numbered as follows. The most significant digits (hundreds) of the reference number correspond to the figure number. For example, elements of FIG. 1 are typically numbered in the range of 100-199, and elements of FIG. 2 are typically numbered in the range of 200-299. Similar elements throughout the figures may be referred to by similar reference numerals. For example, the element 199 in FIG. 1 may be similar (and possibly identical) to the element 299 in FIG. 2. Throughout the figures, each of a plurality of elements 199 may be referred to individually as 199a, 199b, 199c, etc. Such relationships, if any, between similar elements in the same or different figures will become apparent throughout the specification, including, if applicable, in the claims and abstract.

Throughout the descriptions set forth in this disclosure, lowercase numbers or letters may be used, instead of subscripts. For example Vg could be written $V_g$. Generally, lowercase is preferred to maintain uniform font size.) Regarding the use of subscripts (in the drawings, as well as throughout the text of this document), sometimes a character (letter or numeral) is written as a subscript—smaller, and lower than the character (typically a letter) preceding it, such as "$V_s$," (source voltage) or "$H_2O$" (water). For consistency of font size, such acronyms may be written in regular font, without subscripting, using uppercase and lowercase—for example "Vs" and "H2O".

Conventional electronic components may be labeled with conventional schematic-style references comprising a letter (such as A, C, Q, R) indicating the type of electronic component (such as amplifier, capacitor, transistor, resistor, respectively) followed by a number indicating the iteration of that element (such as "1" meaning a first of typically several of a given type of electronic component). Components such as resistors and capacitors typically have two terminals, which may be referred to herein as "ends". In some instances, "signals" are referred to, and reference numerals may point to lines that carry said signals. In the schematic diagrams, the various electronic components are connected to one another, as shown. Usually, lines in a schematic diagram which cross over one another and where there is a dot at the intersection of the two lines are connected with one another, else (if there is no dot at the intersection) they are typically not connected with one another.

DETAILED DESCRIPTION

In the following description, various aspects of techniques for quieting fan noise will be described. For the purpose of explanation, specific configurations and details are set forth in order to provide a thorough understanding of the techniques. However, it will also be apparent to one skilled in the art that the techniques may be practiced without specific details being presented herein. Furthermore, well-known features may be omitted or simplified in order not to obscure the description(s) of the techniques.

Although various features of the invention may be described in the context of a single embodiment, the features may also be provided separately or in any suitable combination. Conversely, although the invention may be described herein in the context of separate embodiments for clarity, the invention may also be implemented in a single embodiment. Furthermore, it should be understood that the invention can be carried out or practiced in various ways, and that the invention can be implemented in embodiments other than the exemplary ones described herein below. The descriptions, examples, methods and materials presented in the in the description, as well as in the claims, should not be construed as limiting, but rather as illustrative.

A mechanical fan is a device used to produce an airflow for the purpose of creature comfort, ventilation, exhaust, or any other gaseous transport.

There are three main types of fans used for moving air: axial, centrifugal (also called radial) and cross-flow (also called tangential).

The axial-flow (or simply "axial") fans have blades that force air to move parallel to the shaft about which the blades rotate. (The direction that the shaft is pointing is the direction of airflow.) Axial fans blow air across the axis of the fan, linearly, hence their name. This type of fan is used in a wide variety of applications, ranging from small cooling fans for electronics (such as in home computers) to the giant fans used in wind tunnels. A ceiling fan suspended from the ceiling of a room is an example of a axial-flow fan. See FIGS. 1A and 1B.

Figure 2:
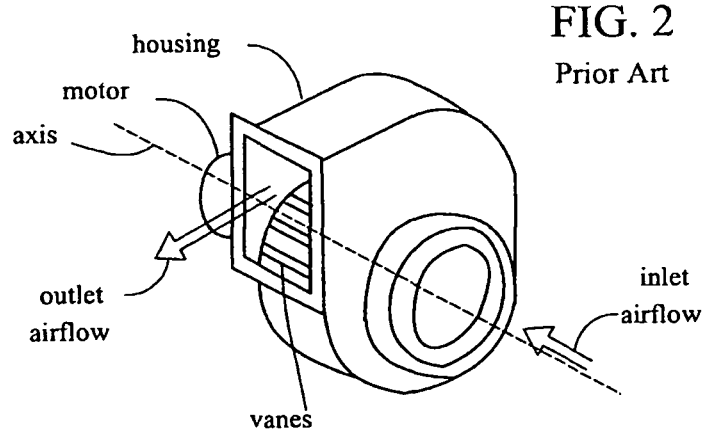
FIG. 2 is a perspective view of a centrifugal-flow fan of the prior art.

The centrifugal (or "centrifugal flow") fan has a moving component (called an impeller) that consists of a central shaft about which a set of blades are positioned. Centrifugal fans blow air at right angles to the intake of the fan, and spin the air outwards to the outlet (centrifugal force). The impeller rotates, causing air to enter the fan near the shaft and move perpendicularly from the shaft to the opening in the scroll-shaped fan casing. A centrifugal fan produces more pressure for a given air volume, and is used where this is desirable such as in leaf blowers, air mattress inflators, and various industrial purposes. They are typically noisier than comparable axial fans. See FIG. 2.

The cross-flow (or "tangential") fan has a squirrel cage rotor (a rotor with a hollow center and axial fan blades along the periphery). Tangential fans take in air along the periphery of the rotor, and expel it through the outlet in a similar fashion to the centrifugal fan. Cross-flow fans give off an even airflow along the entire width of the fan, and are very quiet in operation. They are comparatively bulky, and the air pressure is low. Cross flow fans are often used in air conditioners, automobile ventilation systems, and for cooling in medium-sized equipment such as photocopiers. The action of a fan or blower causes pressures slightly above atmospheric. See FIG. 3.

As used herein, the term "fan" refers to any air-moving device such as the axial, centrifugal or tangential fans described above, having a bladed air-moving component (such as an impeller) which is driven (rotated) by some sort of motor, and which has), and which is enclosed by a housing (casing, cowling, shell) to define an intake (inlet) side and an outtake (outlet, exhaust) side for the fan. The fan may also have a duct extending from the intake side of the fan, and a duct extending from the outtake side of the fan. For an axial flow fan, for example, the intake side and exhaust side ducts may be in-line with one another, or even the same overall duct (with the axial flow fan disposed within the overall duct).

As used herein, the term "air-moving device" may refer to axial fan or tangential fan or centrifugal/radial fan or any other type of impeller that produces airflow.

As used herein, the term "duct" may refer to pipe, tube or similar line conduit, made of metal, plastic or any other stiff material, with rectangular, circular or other cross-section. Generally, the cross-sections of the inlet and outlet ducts may be substantially similar in shape and size to the respective inlet and outlet.

The duct may include one or more air moving devices, while more than one air-moving device may be positioned with or without a gap between them. This gap may serve to impose laminar airflow and/or to eliminate vortices which stem from the mutual influence of the air-moving devices.

The duct may include one or more louvers at the ends of the ducts that serve up for safety purposes (like finger grills) or for imposing laminar airflow. A louver can be placed between the air-moving devices (if there are more than one) for the laminar air-flow purpose.

The duct may include inlet and/or outlet cones such that the air flow to the impeller will be uniform resulting in the optimum performance being achieved and minimum noise level.

The dimensions of the duct may be determined among others by the air-moving devices dimensions, the required noise reduction and the product to which the apparatus disclosed herein is addressed:

Air-moving devices dimensions: For example, if the air-moving device is a 120 mm diameter axial fan, the cross-section of the duct may be a square of 130×130 mm which includes the width of the fan and enough room for vibrations-damper to couple the fan with the duct. The length of the duct may be 180-240 mm long which is 1.5-2.0 times the fan's diameter to keep up the fan performance.

Required noise reduction: the ANC system is influenced by the length of the duct which is related to the distance between the speaker and the reference microphone. Generally, the longer the duct is, the better the noise reduction achieved.

The product: Server and rack dimensions are usually 19" width, and the height is typically measured in "U", where each U is 1.75". The Quiet Fan width can be sized such that multiple Quiet Fans can fit across the width of a rack, for example to enable locating 4 Quiet Fan units side-by-side along the width of a rack mounted server. The Quiet Fans may have, for example, a height of 2 U.

The apparatus disclosed herein may include a controller that controls the air-moving devices speed according to the ambient temperature, humidity or other sensed parameters.

The apparatus disclosed herein may include an electronic connector to enable access to the controller by the product the invention is addressed to (for example, server) for control purpose. The connector may serve to provide power supply to the QuietFan unit from the product power supply.

ANC

Active Noise Control (ANC) is a technology using noise to reduce noise. It is based on the principle of superposition of sound waves. Generally, sound is a wave which is travelling in space. If another, second sound wave having the same amplitude but opposite phase to the first sound wave can be created, the first wave can be totally cancelled. The second sound wave is named "antinoise". Although the idea of ANC is not new, its practical application had to wait for the recent development of sufficiently fast electronic control technology.

The basic idea behind Active Noise Control (ANC) has been known for more then 70 years. Producing an opposing signal (anti-noise) with the same amplitude as the noise you want to reduce (unwanted noise) but with the opposite phase, yields a significant reduction in the noise level. According to the superposition of waves, two waves with equal amplitude and identical phase have an additive effect, resulting in a doubling of the overall amplitude. On the other hand, two waves with equal amplitude but opposite phase, have a subtractive effect, resulting in a decrease in the overall amplitude. The phase describes the relative position of the wave in its rising and falling cycle. If two waves are in phase, they rise and fall together but if they are exactly out of phase, one rises as the other falls, and so they cancel out one another. ANC tries to eliminate sound components by adding the exact opposite sound. The level of attenuation is highly dependent on the accuracy of the system for producing the amplitude and the phase of the reductive signal (anti-noise). A comprehensive theoretical basis of ANC can be found in the literature.

Figure 4:
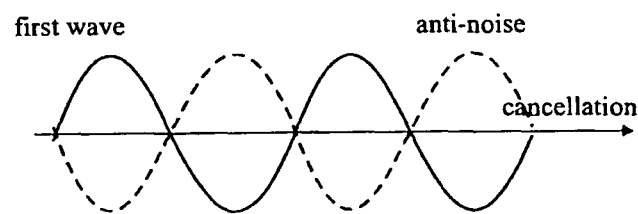
FIG. 4 is a diagram showing the superposition and cancellation of unwanted noise and anti-noise, according to the prior art.

See FIG. 4, which shows the superposition of a first wave (solid line) which is "unwanted noise", with a second wave (dashed line) which is "antinoise". These two waves are substantially equal in amplitude and opposite in phase (when one is positive, the other is negative), resulting in substantially complete cancellation.

ANC Building Blocks

Figure 5:
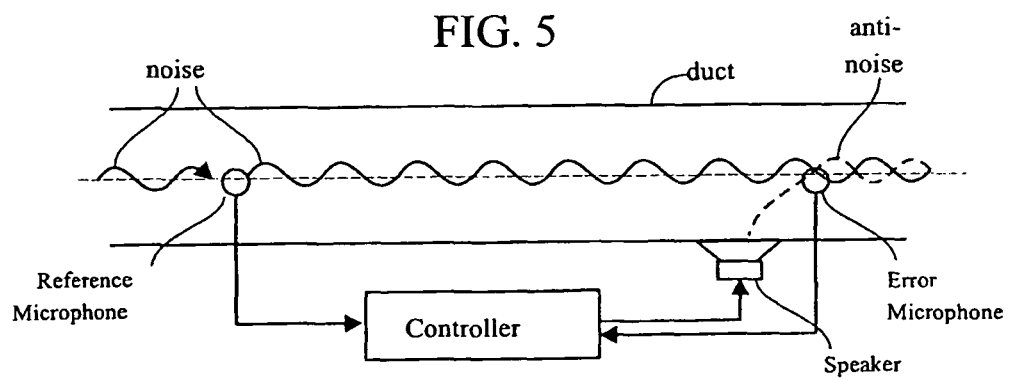
FIG. 5 is a diagram showing major components of an ANC system of the prior art.

According to ANC theory, there are four major components of an ANC system (see FIG. 5):

Reference microphone: the microphone that receives the noise to be cancelled (unwanted noise) and forwards it to the controller.

Error microphone: the microphone that senses the noise at the point at which noise reduction is required and monitors how well the ANC system performs.

Speaker: the device that physically does the work of producing anti-noise.

Controller: a signal processor (usually digital) that tells the speaker what to do. In the simplest case, the DSP controller multiplies the reference microphone signal by minus one and sends it to the speaker to produce the anti-noise.

By detecting the unwanted noise (solid line, FIG. 5) with the reference microphone, the ANC system can automatically generate the correct signal to send to the speaker, which will produce the anti-noise (dashed line, FIG. 5) to cancel out the unwanted noise. The size of the quiet zone created near the error microphone depends on the wavelength of the noise. The effectiveness of the noise cancellation depends on the size and shape of the room in which the system is applied, the size of the source of the unwanted noise, the position of the speaker, the accuracy of the controller and many other parameters.

As used herein, the term "speaker" may refer to dynamic speaker, Piezo speaker, EMF (Electro-Magnetic Film) speaker or any other type of acoustic actuator.

As used herein, the term "microphone" may refer to any kind of sound measure to electrical signal transducer such as microphone or accelerometers, for example, electrostatic, piezo and laser microphones.

ANC Categories

Traditionally, ANC is classified as either global ANC or local ANC. In global ANC, the goal is to achieve satisfactory noise reduction in a large area where the listeners are able to move around freely, while local ANC targets only noise reduction at specific points in space, usually inside a head phone or at the ears of a listener with restricted head movement. Although global ANC seems more beneficial generally than local ANC, it is regarded as much more complicated to achieve due to wavelength and acoustic field considerations. Referring to the primary and secondary noise sources as to point sources, the maximum distance between the two sources is highly dependent on the maximum frequency of the noise to be reduced. As a rule-of-thumb, while the two sources are arbitrarily positioned in space, noise reduction of greater than 10 dB is generally achieved only within a quiet zone around the error microphone with dimensions of approximately one tenth of a wavelength. From the opposite standpoint, to achieve homogenous noise reduction of more then 10 dB over all the space, the distance between the two point sources should not exceed one-tenth of the wavelength associated with the maximum frequency. Therefore, achieving a 10 dB noise reduction in a frequency band of up to 1 kHz, requires a distance that is less than 3.4 cm, which is certainly small in light of the typical speaker dimensions. (A typical wavelength for 1000 Hz sound, in air, is 0.344 meters, and for 10 KHz sound is 0.034 meters.) However, in a real ANC application, the situation is a little bit complicated since the noise sources are not point sources and other physical considerations must be made.

As used herein, "primary noise source" refers to the unwanted noise source (such as the fan), and "secondary noise source" refers to the destructive noise source (such as the speaker of the ANC system). A "point source" refers to a source with no geometrical dimensions (point), which is a customary assumption that is taken for simplification of the acoustic discussion. It is easy to simulate and to analytically analyze such a "hypothetical" source.

The above terminology does not reflect the diverse characteristics of the noise source. Similarly, the two types of quiet zones are described with the terms global and local, and the noise source can be regarded as a point source or a spatial source. This distinction warrants adoption of the following four terms to describe both the noise source and quiet zone characteristics:

Point-to-Point ANC: In which the noise source is positioned in a small limited area in space and the quiet zone obtained is local as well. These systems are easy to install and are very effective for educational and demonstration purposes.

Zone-to-Point ANC: Where the noise source is distributed over a region and the required quiet zone is local. This category includes active headphones and active passenger seats in an airplane.

Point-to-Zone ANC: In this category, the noise source is localized and the required quiet zone is spatial. ANC systems in this category are usually embedded in the noise-generating application or at least are very close to it. For example, the "Quiet Fan" disclosed herein.

Zone-to-Zone ANC: This is referred as the holy grail of ANC. A robust system that is positioned in a room and reduces the disturbing noise no matter what the sources, without of course disturbing conversation in the room. Studies under these conditions demonstrate noise reduction in tonal or narrowband frequencies and require a significant number of speakers and sensors.

Three Challenges

Although ANC is not new, most of the commercial applications fall within the Zone-to-Point category. In the Point-to-Zone category, which is most relevant to the Quiet Fan of the present disclosure, three major issues need to be resolved in order to implement an ANC system: (i) the paths timing, (ii) the echo cancellation and (iii) the acoustic field overlap.

Paths Timing

The paths timing issue is the most complicated of the three. Assume, for the sake of simplicity, that what the controller does is just multiply the signal acquired by the reference microphone by minus one and transmits it through the speaker. Such a situation would be possible only if the reference microphone and the speaker were ideal devices (the transfer function is identically one). A necessary condition for the basic principle of ANC to be applied, even in this hypothetical situation, is that the unwanted noise (solid line in FIG. 4) and the anti-noise (dashed line in FIG. 4) meet at the point of the error microphone at the same time.

Figure 6:
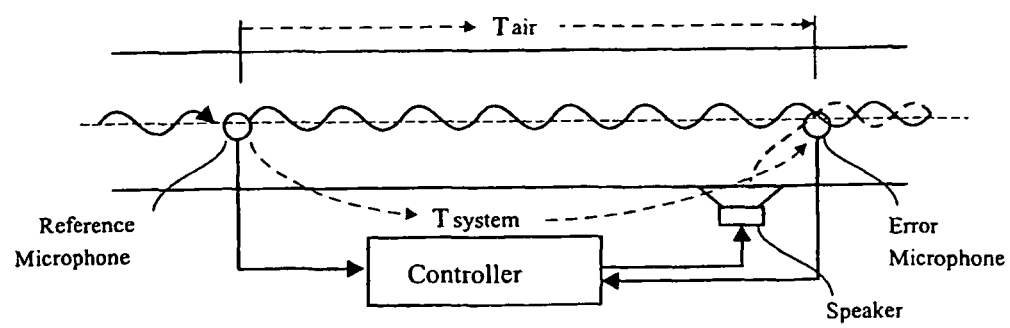
FIG. 6 is a diagram showing the paths timing issue in an ANC system of the prior art.

As can be seen in FIG. 6, the unwanted noise has to follow two paths from the reference microphone to the point of collision: the path through air (Tair) and the so-called system path (Tsystem) that consists of the reference microphone, the controller and the speaker. If we denote the travelling time of the unwanted signal through the air by Tair and the travelling time through the system by Tsystem, it is necessary to have: Tsystem<=Tair. The "less-than" in this "less-than-or-equal-to" relationship is due to the possibility of adding an artificial delay in the controller.

Unfortunately, in most cases Tsystem is significant. This is due largely to the group delay of dynamic speakers that are widely used in ANC systems.

Figure 7:
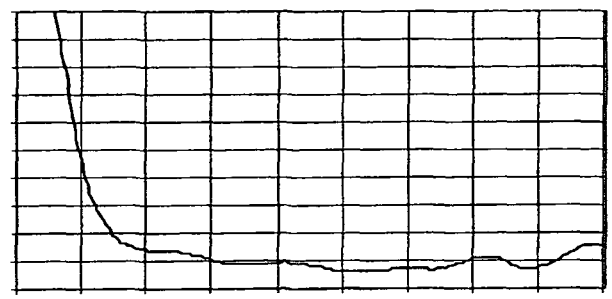
FIG. 7 is a graph illustrating group delay in a dynamic speaker of the prior art.

FIG. 7 illustrates group delay of a typical dynamic speaker (Y-axis is in msec). As can be seen in FIG. 7, a typical dynamic speaker has a group delay of about 0.2 msec in the frequency range of 200-1500 Hz that is the relevant range for ANC. A typical ANC controller, consisting of a codec, DSP and power-amplifier, has further group delay of about 0.15 msec. For c=340 m/sec this implies a Tsystem of about 12 cm between the reference microphone and the speaker. Taking into account the speaker diameter, the microphone housing and other mechanical considerations, a minimal ANC system length can exceed 25 cm.

Two ways are considered (in the literature) for handling the paths timing issue: a duct or a prediction filter (predictor).

ANC systems using ducts are generally known. When implementing ANC systems in a duct, a sufficient distance between the reference microphone and the speaker may be achieved, while avoiding the limitation of one-tenth of the wavelength distance between the unwanted noise source and the speaker. The duct reflects the unwanted noise source so that it is close to the speaker.

The prediction filter is a technique to reduce the Tsystem by means of mathematical algorithms. The prediction filter receives the unwanted noise from the reference microphone and predicts the unwanted noise at a later time. As a result, the prediction filter feeds the speaker with a signal that is able to "catch" unwanted noise that follows a shorter path between the reference microphone and the error microphone.

Echo Cancellation

Figure 8:
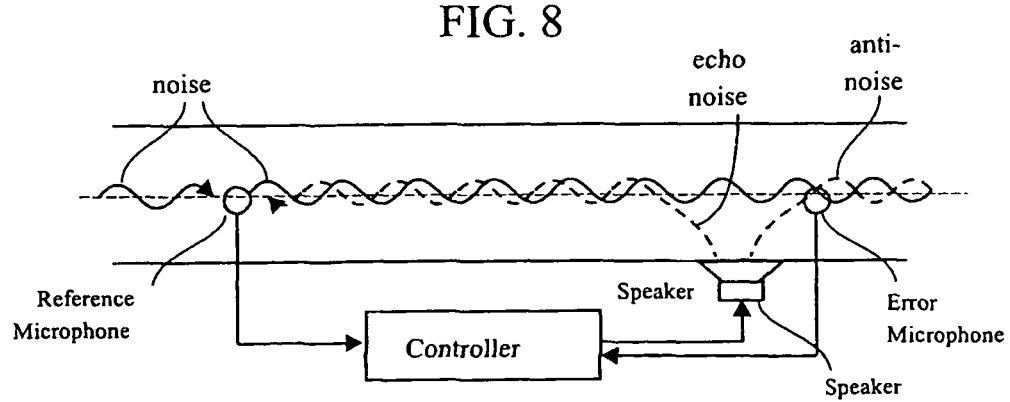
FIG. 8 is a diagram showing the echo issue in an ANC system of the prior art.

In ANC systems, the echo issue occurs when the output from the speaker is picked up by the reference microphone. This usually occurs, since the speaker emits the anti-noise in a backward direction as well as in a forward one. FIG. 8 depicts the forward and the backward directions of the anti-noise. The backward direction ("echo noise", dashed line, arrow pointing left) is the cause of the echo. The phenomenon also is referred to in the literature as feedback.

The problem that stems from the echo is that the controller cannot solely process the unwanted noise, since it is combined together with the echo noise. The simplest approach to solving the echo problem is to use a separate echo cancellation filter within the controller, usually referred as an "echo canceller", which is exactly the same technique as is used in acoustic echo cancellation. This electrical model of the feedback path is driven by the signal that is sent to the speaker and its output is subtracted from the reference microphone signal.

An existing problem in adaptive echo cancellation is to provide echo cancellation during "double-talk", in the presence of the unwanted noise. In the case of double-talk, the unwanted noise signal interferes with the adaptive algorithm that invariably leads the adaptive filter to diverge from the optimum solution. To overcome the double-talk problem, almost all of the current echo cancellation techniques attempt to effectively turn off the adaptive filter during double-talk.

Regarding "double talk", when you use a cell phone for example, when you talk, the speaker at the other side produces the sound, which is also picked up by the other side's microphone. The result is that you hear yourself via your speaker. This is why echo canceller is required. The echo canceller can adaptively improve itself when only one of the sides talks. Double-Talk is the condition where users at both ends of the line are talking simultaneously, during which the echo canceller algorithm should not try to change its parameters.

Acoustic Field Overlap

The acoustic (or sound) field is the pressure gradient radiating from a sound source. In order to achieve satisfactory noise reduction in a large area, the unwanted noise and the anti-noise should have the same amplitude and the opposite phase, at each frequency at every point in the space. In other words, the acoustic field of the unwanted noise source and the acoustic field of the speaker should be perfectly coincident. Thus, for an ANC system to achieve an absolute noise reduction, all that is needed is to produce the same acoustic field by one or several speakers. Unfortunately, in most cases, the acoustic field of the unwanted noise is complicated and current speaker technology cannot bring it out.

There are three approaches to coping with this limitation. One is to apply ANC to the application in which only a limited local quiet zone is required (such as in Zone-to-Point applications). The second approach is to synthesize the physical characteristics of the unwanted noise field in an extended listening area, by a multi-channel equalization technique that allows for control of the sound field produced by a loudspeaker array at a limited number of positions. The third approach is to shape the unwanted noise source field by means of ducts and simplify it.

When low frequency sound waves travel through a duct, this yields an essentially one-dimensional problem. The spatial character of a sound field depends on the wavelength and therefore on the frequency. Active noise control (ANC) generally works best when the wavelength is long compared to the dimensions of its surroundings, such as at low frequencies. Fortunately, as mentioned above, passive methods tend to work best at high frequencies. Most ANC systems combine passive and active techniques to cover a range of frequencies.

Figure 9:
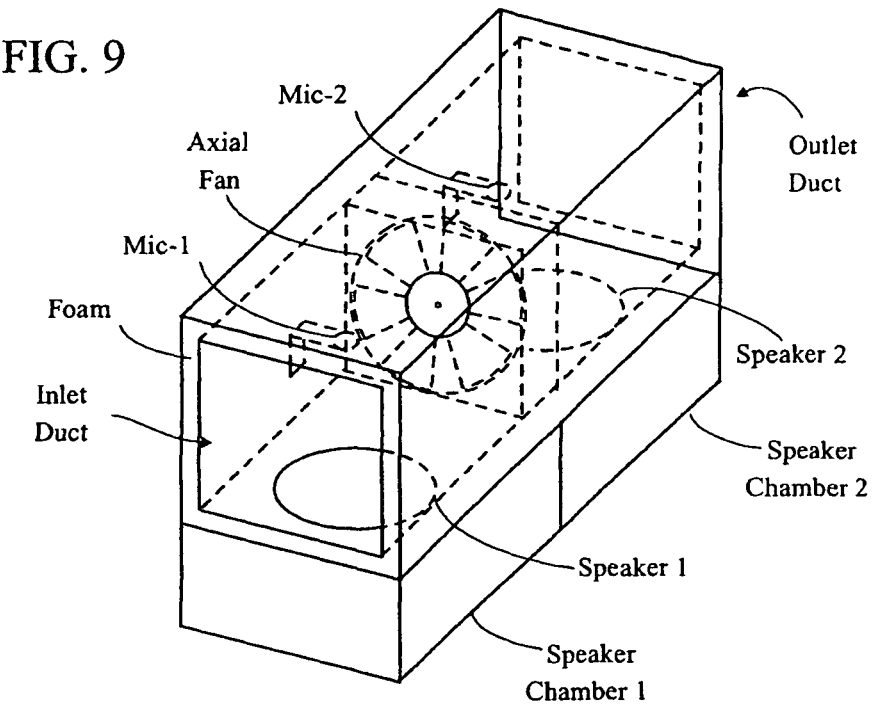
FIG. 9 is a perspective view of a hybrid active/passive muffler for an axial fan, according to the disclosure.
Figure 11:
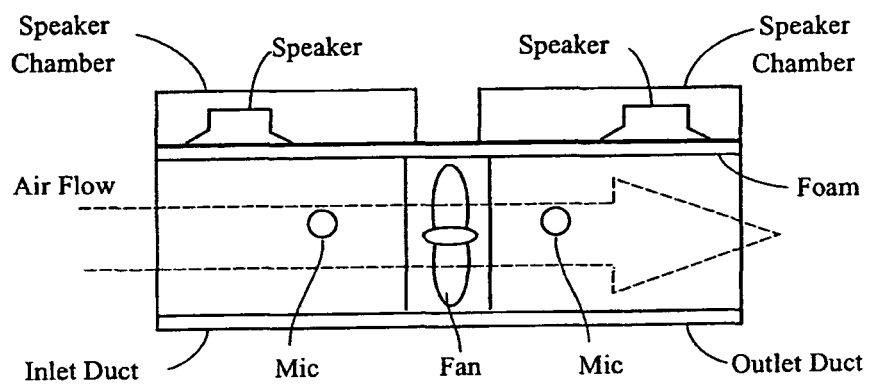
FIG. 11 is a cross-sectional view of an axial fan having an ANC system on its inlet side and another ANC system on its outlet side, according to an embodiment of the disclosure.

An example of an ANC system in a duct is a hybrid active/passive muffler for an axial fan, and is illustrated by the "Quiet Fan" with ANC incorporated into inlet and outlet ducts, such as shown in FIG. 9 and FIG. 11, discussed in greater detail hereinbelow.

Algorithms and Methods

Figure 10A:
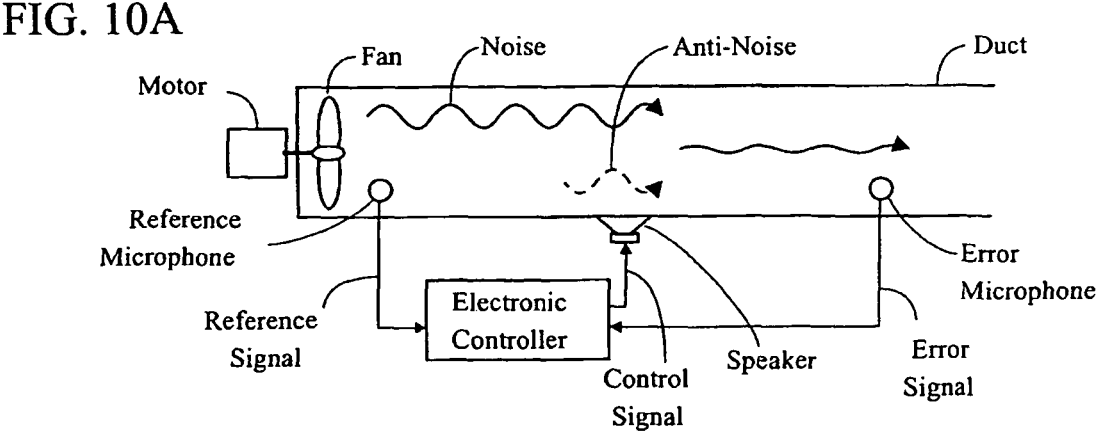
FIG. 10A is a diagram illustrating an ANC system of the prior art using feed forward.
Figure 10B:
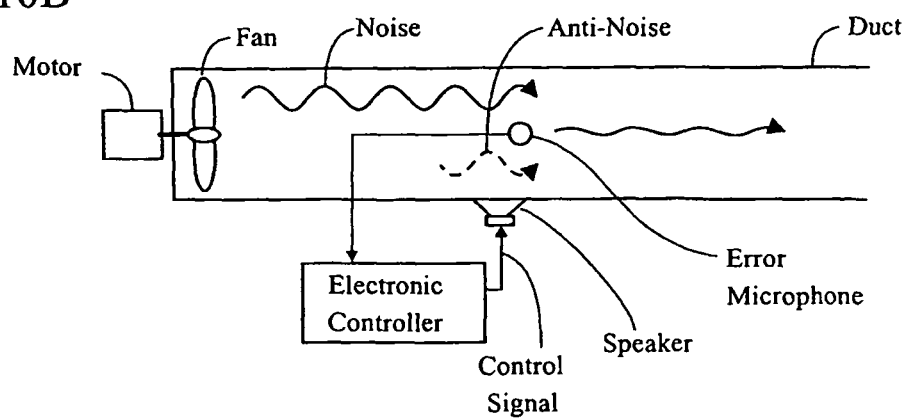
FIG. 10B is a diagram illustrating an ANC system of the prior art using feedback.

FIGS. 10A and 10B illustrate ANC systems based on feed forward (or "feedforward") and feedback control, respectively. ANC is based on the use of either feed forward control or feedback control. In feed forward control, the unwanted noise signal is picked up before it propagates to the speaker. In feedback control, however, the controller attempts to attenuate the noise without the benefit of the previously described reference signal. The problem with feed forward control then is that a coherent reference signal is needed. If such a reference signal is not available, feedback control is then the alternative option. However, the control bandwidth achieved in feedback control is typically very narrow due to the nature of the speaker dynamics in the low 100-500 Hz range. The performance achieved is highly limited by the available gain and phase margins. Feed forward ANC is generally more effective than feedback ANC, especially when the feed forward system has a reference signal isolated from the anti-noise source. Most ANC systems in use and under development use feed forward control.

One of the most popular algorithms to implement the controller between the reference microphone and the speaker is the Filtered-X LMS algorithm, developed by Morgan. This method is an adaptive algorithm whose goal is to minimize the energy of the signal at the error microphone. See, for example, U.S. Pat. No. 5,475,761, incorporated by reference herein, which discloses an adaptive feed forward and feedback control system A useful method to avoid the need for a real error microphone in a feed forward ANC system is the virtual microphone theory, already described in the literature. This is based on a previously measured acoustic transfer function between the reference microphone and the error microphone, temporarily placed at a position further away from the reference microphone and a previously measured acoustic transfer function between the speaker input and the error microphone. Applying the transfer function between the reference microphone and the error microphone to the reference microphone signal, yields an estimation of the source noise at the error microphone location. Applying the transfer function between the speaker input and the error microphone to the speaker input signal, yields an estimation of the reductive signal at the error microphone location. Adding the two estimated signals yields an estimation of the error signal and the microphone itself can be removed and stay virtual only.

An Embodiment of a Quiet Fan

While implementing ANC systems to any kind of fan, whether to both inlet (intake) and outlet (outtake) or to only one of the openings, a "quiet fan" to produce air is achieved. This quiet fan produces low level of noise compared to any other device based on fan, which produces the same capacity of airflow. The quiet fan may be comprised in any mechanical system which requires airflow induction such as: computers, air conditioners, machines, and more.

FIG. 11 illustrates that an ANC system may be implemented to both sides of a fan, forming a dual active noise control system. See also FIG. 9. In FIG. 11, the overall airflow is represented, from inlet, through the inlet duct, through the fan, and through the outlet duct.

In FIG. 9, a microphone (Mic-1) is shown in the inlet duct, and a microphone (Mic-2) is shown in the outlet duct. Each microphone may be located on the central axis of the duct an appropriate distance (such as 3 cm) from the center of the fan to avoid vortices near the sensor (microphone). The microphone may be located at the end of a metal or plastic support (or bracket), extending from a sidewall of the respective duct. The microphones may be faced with the air stream to avoid permanent pressure on the membrane, and may be protected by a windscreen made from an open cell type porous elastomer.

In general, a duct (inlet duct) is provided on the inlet side of the fan extending from the inlet side of the fan, and a duct (outlet duct) is provided on the outlet side of the fan extending from the outlet side of the fan. The fan may be an axial flow fan, in which case the inlet and outlet ducts may be substantially collinear with each other, and may be essentially integral with one another (the inlet duct being a portion of an overall duct, and the outlet duct being another portion of the overall duct, and the fan disposed within a central portion of the overall duct between the inlet and outlet portions).

Figure 1A:
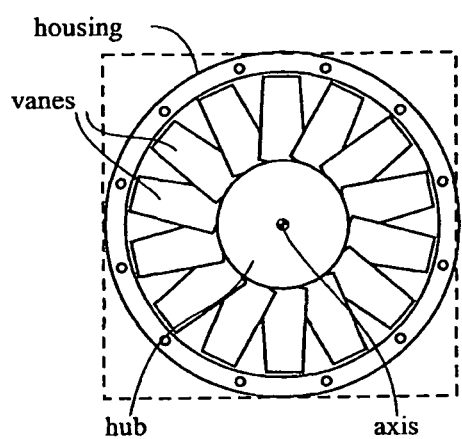
FIG. 1A is a front view of an axial-flow fan of the prior art.
Figure 1B:
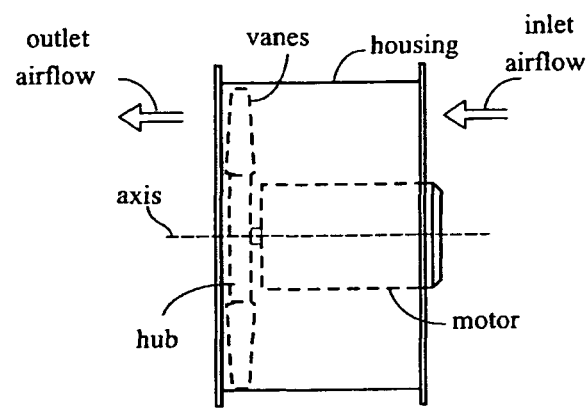
FIG. 1B is a side view of the axial-flow fan of FIG. 1A.

The fan may be an axial flow fan, of any diameter, such as but not limited to 90 mm, having blades and a housing, such as was illustrated in FIGS. 1A and 1B, but with a square housing. (An axial flow fan with a square housing is illustrated in FIG. 9.) A motor may be incorporated into the hub (surrounding the mandrill, at the center of the fan).

The ducts may be square ducts, measuring for example 100 mm×100 mm, and each having a length of at least 300 mm.

Each of the inlet and outlet ducts is provided with its own ANC system comprising a loudspeaker and a reference microphone (controller(s) not shown). Stated conversely, one ANC system is associated with the inlet duct, and another ANC system is associated with the outlet duct. The microphone of each ANC system may be disposed within the duct, and the speaker of each ANC system may be disposed to generate anti-noise to interact with noise being propagated in the air passing through the duct.

Each of the inlet and outlet duct ANC systems may have its own electronic controller, or there may be one common electronic controller for both the inlet and outlet ANC systems, such as a Silentium S-Cube 4.1 dual channel board, based on the ADI BF533 DSP processor.

Each microphone is located an appropriate distance (such as 3 cm) from the center of the fan to avoid vortices near the sensor. The microphones may be electret type microphones.

The speakers may be 3-5 inch dynamic speakers. Generally, the bigger the diameter of the speaker, the lower frequency noise the speaker can produce. Typically, a 3-inch speaker can produce noise above 120 Hz, hence it can serve to reduce noise only above 120 Hz, while a 5-inch speaker can produce noise above 70 Hz, hence it can serve to reduce noise above 70 Hz. Generally, the bigger, the better.

The inside surfaces (or panels) of the ducts may be covered with a sound absorption material for use in passive noise control, such as 10 mm thick acoustic foam to attenuate noise in the high frequency band.

Figure 3:
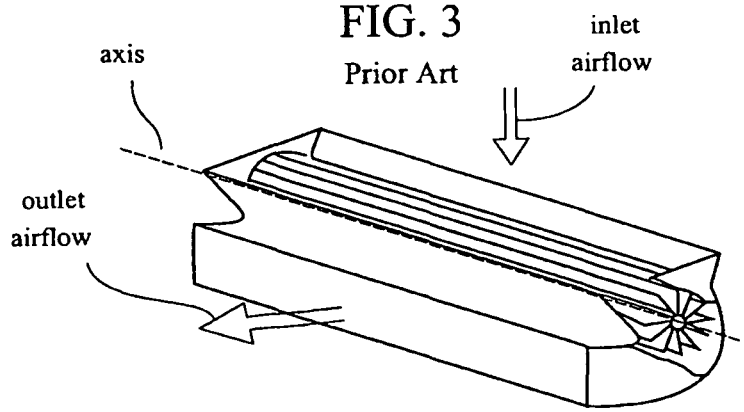
FIG. 3 is a perspective view of a tangential-flow fan of the prior art.
Figure 12:
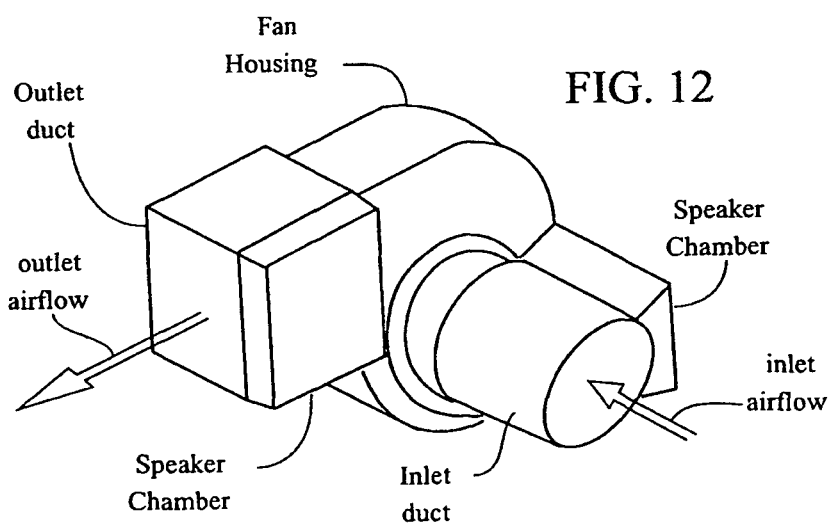
FIG. 12 is a perspective view of a centrifugal fan having an ANC system on its inlet side and another ANC system on its outlet side, according to an embodiment of the disclosure.
Figure 13:
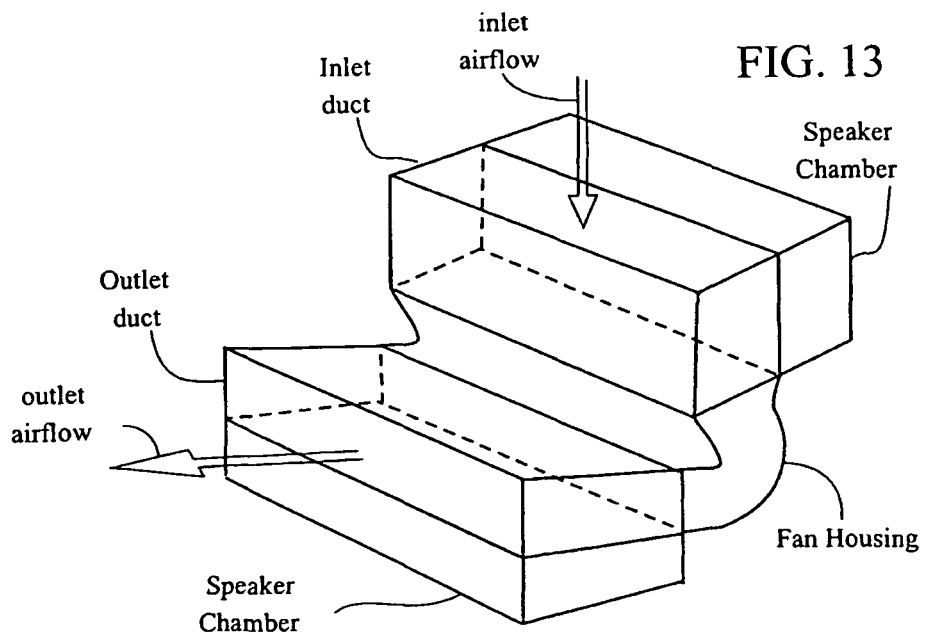
FIG. 13 is a perspective view of a tangential fan having an ANC system on its inlet side and another ANC system on its outlet side, according to an embodiment of the disclosure.

Alternatively, the ANC system may be implemented to the inlet and outlet of centrifugal fans, as shown in FIG. 12 (compare FIG. 2), or to the inlet and outlet of tangential fans as shown in FIG. 13 compare FIG. 3). In both cases, the inlet and outlet ANC systems are shown as being implemented in inlet and outlet ducts extending in the appropriate direction from the inlet and outlet sides, respectively, of the centrifugal and tangential fans. In FIGS. 12 and 13, speakers and microphones are omitted, for illustrative clarity.

FIGS. 9, 11, 12 and 13 show speaker chambers, and it can be seen that each speaker is disposed in a speaker chamber (enclosure) which is adjacent to the respective inlet or outlet duct of the fan system. The purpose of having a speaker chamber is to prevent noise from being emitted to the wrong side of the speaker, and hence to produce noise. There are two disadvantages with the speaker resonance: (i) resonance within the speaker which may be resolved by filling the chamber with foam or wool to absorb the acoustic energy, and (ii) a resistance to the membrane movement which increases the response time. This may be resolved by enlarging the chamber. Generally, the bigger the chamber, the better the performance. Generally, it may be desired to reduce the depth of the chamber to a minimum, which may lead to using all of the area of the duct panel to increase the volume of the chamber.

In the description that follows, the example of an ANC system implemented to both the inlet and outlet sides of an axial-flow fan is described in greater detail. As will become evident, echo cancellation is a concern in such a situation.

Interlaced Echo Cancellation (EC)

The term Echo Cancellation (EC) is used to describe the process of removing acoustic echo which is added to the desired signal. In ANC systems, the echo issue occurs when the output from the speaker is picked up by the reference microphone. This usually occurs, since the speaker emits the anti-noise in a backward direction as well as in a forward one.

FIG. 8 (above) illustrates the forward (to the right, from the speaker) and the backward (to the left, from the speaker) directions of the anti-noise. The backward direction is the cause of the echo. The phenomenon also is referred to in the literature as feedback.

The problem that stems from the echo is that the controller cannot solely process the unwanted noise, since it is combined together with the echo noise. The simplest approach to solving the echo problem is to use a separate echo cancellation filter within the controller, usually referred to as an "echo canceller", which is the same technique as is used in acoustic echo cancellation. This electrical model of the feedback path is driven by the signal that is sent to the speaker, and its output is subtracted from the reference microphone signal.

In an embodiment of the Quiet Fan having ANC in ducts on both the inlet and outlet sides, such as shown in FIG. 11, the echo problem is exacerbated due to the fact that each of the microphones senses both of the speakers.

Figure 14:
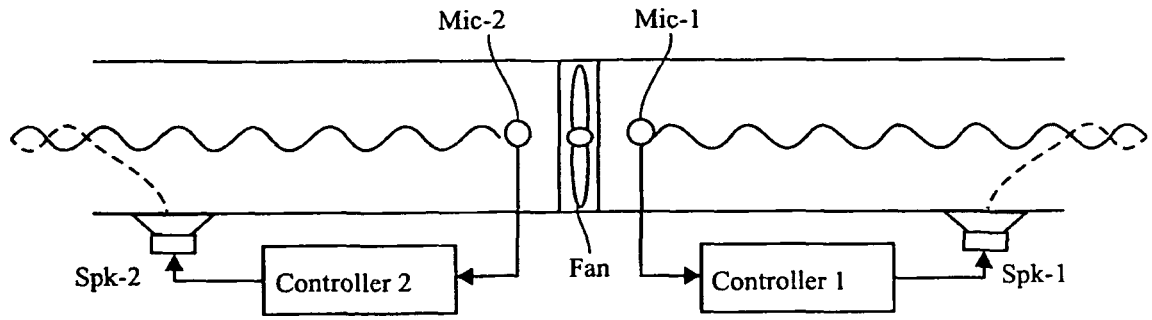
FIG. 14 is a diagram illustrating a scheme for dealing with unwanted noise and destructive noise, according to the disclosure.

FIG. 14 illustrates the unwanted noise signals emitted by the fan in both directions (solid lines extending to the left and to the right, from the fan): to the inlet and the outlet, and the destructive noise signals that are emitted by the speakers (dashed lines extending from the speakers).

For purposes of this part of the description,
the right ANC system ("1") components comprise Spkr-1 for the speaker and Mic-1 for the reference microphone, and are under the control of Controller 1; and
the left ANC system ("2") components comprise Spk-2 for the speaker and Mic-2 for the reference microphone, and are under the control of Controller 2.

("1" may be either the inlet or the outlet, and "2" may be either the outlet or the inlet)

Figure 15:
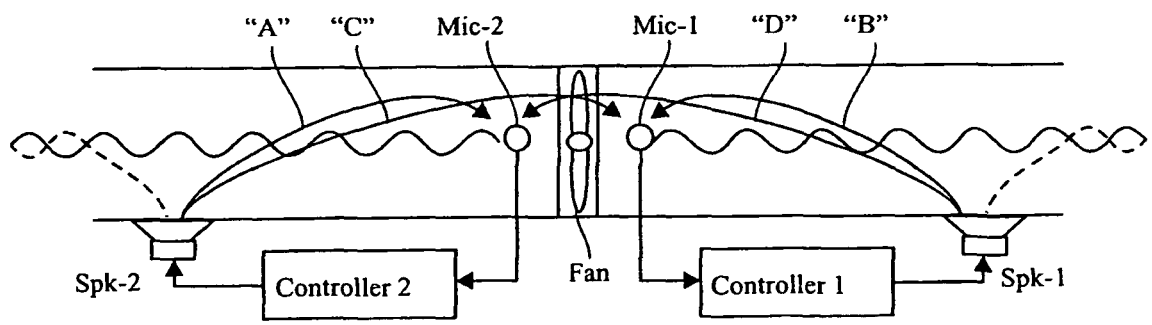
FIG. 15 is a diagram illustrating a scheme for dealing with echo signals, according to the disclosure.

As can be seen in FIG. 15, the destructive (anti-noise) signals produced by each of the two speakers are sensed by each of the two reference microphones. This leads to four different noises: one is from Spk-1 to Mic-1, two is from Spk-1 to Mic-2, three is from Spk-2 to Mic-1 and four is from Spk-2 to Mic-2.

The following four acoustic signal (echo) paths are shown in FIG. 15,
signal "A": from Spk-2 to Mic-2
signal "B": from Spk-1 to Mic-1
signal "C": from Spk-2 to Mic-1
signal "D": from Spk-1 to Mic-2

The "direct" echo signals existing within each ANC system, which would be Spk-1 to Mic-1 ("B") and Spk-2 to Mic-2 ("A"), can be resolved with the customary EC solution as described above.

The other two echo signals, which are Spk-1 to Mic-2 ("D") and Spk-2 to Mic-1 ("C"), may be referred to as "cross-echoes". The levels of the cross-echoes (Spk-1 to Mic-2 and Spk-2 to Mic-1) are influenced by the distance between the speaker (such as Spk-1) and its cross microphone (such as Mic-2), and by the fan noise level. The shorter the distance and the higher the fan noise level, the higher the levels of the cross-echoes. The ANC technology embedded into the Quiet Fan may dramatically reduce the overall length of the unit (from the leftmost point to the rightmost point of the ducts in FIG. 15) to 200-300 mm. This length compels an aggressive and effective solution to the increased cross-echo issue.

Interlaced Algorithm

To solve (reduce) the cross-echo problem, an interlaced cancellation algorithm may be used. This algorithm is basically a combination of two standard EC algorithms, each of which is responsible for canceling out the re-entering signals from each of the speakers.

Figure 16:
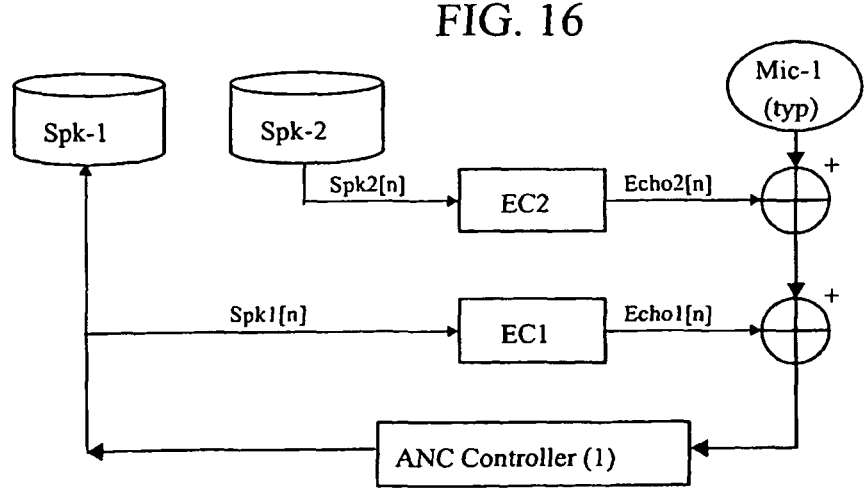
FIG. 16 is a diagram illustrating an interlaced EC configuration, according to the disclosure.

FIG. 16 describes the echo signals related to one of the two reference microphone (Mic-1 in this case). (The other of the two microphones, Mic-2, would receive similar treatment.) This microphone (Mic-1) senses the destructive noise from both speakers (Spk-1 and Spk-2). These signals superimpose with the unwanted noise that is needed to be forwarded to the controller, therefore fail to produce the noise reduction. Similarly to the regular EC method, these echo signals firstly have to be estimated and secondly have to be subtracted from the Mic-1 signal before entering to the controller. (This is a feed forward control scheme.)

The estimation method may be as follows:
1. A digital filter, EC1, is built to represent the feedback path between Spk-1 and Mic-1 ("B")
2. The filter EC1 is driven by the signal that is sent to Spk-1 by Controller 1.
3. Another digital filter, EC2, is built to represent the feedback path between Spk-2 and Mic-1 ("C").
4. The filter EC2 is driven by the signal that is sent to Spk-2 by Controller 2.

The outputs of each of the filters EC1 and EC2 may be successively (both) subtracted from the Mic-1 signal as depicted in FIG. 16, before going to the controller (Controller 1). (The order in which the outputs are subtracted from the Mic-1 signal is not important.)

The configuration depicted in FIG. 16 referred only to the echo signals related to Mic-1 (and Controller 1). The same configuration may be realized to resolve the echo signals related to Mic-2 (by substituting "2" for "1", and "1" for "2"). This implies four echo-canceller modules for the two ANC systems. This also implies a massive data transfer between the ANC systems, where the output of the controller of one ANC system is needed for the cross echo-canceller of the other ANC system and vice-versa.

The implementation of the interlaced algorithm takes advantage of the Silentium S-Cube dual channel ANC controller, in which both ANC algorithms are implemented on the same DSP; therefore, the speaker drive signals Spk2[n] and Spk1[n] are available for both interlaced ECs with minimal complexity in the data transfer. In other words, both controller 1 and controller 2 can be implemented in one dual channel (channel 1 and channel 2) controller. The algorithm described herein may be executed as software within the controller.

Dual Channel ANC Controller

The Silentium S-Cube 4.1 is a dual-channel Analog-Devices Blackfin™ DSP-based controller for active noise control (ANC). Along with a 12V DC adaptor, one or two off-the-shelf electret microphones and one or two off-the-shelf speakers, the S-Cube 4.1 constitutes an easy-to-use, effective Active Noise Control system which is capable of reducing up to 13 dBA sound power level (SWL).

The S-Cube 4.1 measures the unwanted noise with one or two electret microphones hooked up to a-14 bit ADC (analog-to-digital converter), and produces the destructive noise via one or two dynamic speakers. The signals to the speakers are continuously computed by a set of adaptive filters implemented on the Analog Devices ADSP-533 Blackfin™ processor, which enables the system to rapidly track changes in noise level and characteristic.

Results and Performance

A prototype of a 92×92×38 mm axial fan (FFB0912EHE by Delta, 110.18 CFM @4800 RPM, 55.0 dBA, 12.00 W, 1.00 amp, 12 v DC, 3+4 pin power connectors) with two ANC systems implemented to both sides of the fan (intake and outtake) was built (see, for example, FIG. 11). The sound power level was measured, with and without ANC, with and without passive (foam), and the results achieved were:

| Measurements state | SWL [dBA] | Sound Power reduction [dBA] |
|---|---|---|
| Original (no passive, no ANC) | 67.9 | |
| Passive inlet | 66.8 | 1.1 (passive only) |
| Passive outlet | 66.0 | 1.9 (passive only) |
| Passive Inlet and outlet | 64.5 | 3.4 (passive only) |
| ANC inlet (both sides with passive) | 57.8 | 10.1 (Passive and active)/ 6.7 (active only) |
| ANC outlet (both sides with passive) | 58.2 | 9.7 (Passive and active)/ 6.3. (active only) |
| ANC inlet and outlet (both sides with passive) | 54.3 | 13.6 (Passive and active)/ 10.2 (active only) |

From these results, it is evident that the addition of ANC and passive techniques may provide a significant reduction in sound power.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations.

What is claimed is:

1. A quiet fan comprising:
an air-moving device having an inlet side and an outlet side;
a first active noise control (ANC) sub-system disposed on the inlet side, the first active noise control sub-system including:
a first acoustic transducer; and
a first reference acoustic sensor to generate a first reference noise signal corresponding to a first sensed pattern sensed by said first reference acoustic sensor, the first sensed pattern including a first noise pattern from said air-moving device, the first reference acoustic sensor being between the air-moving device and the first acoustic transducer, the first reference acoustic sensor to sense said first sensed pattern prior to the first noise pattern arriving at a location of said first acoustic transducer;
a second active noise control (ANC) sub-system disposed on the outlet side, the second active noise control sub-system including:
a second acoustic transducer; and
a second reference acoustic sensor to generate a second reference noise signal corresponding to a second sensed pattern sensed by said second reference acoustic sensor, the second sensed pattern including a second noise pattern from said air-moving device, the second reference acoustic sensor being between the air-moving device and the second acoustic transducer, the second reference acoustic sensor to sense said second sensed pattern prior to the second noise pattern arriving at a location of said second acoustic transducer;
a controller to generate a first control signal to control said first acoustic transducer to generate a first noise destructive pattern, and to generate a second control signal to control said second acoustic transducer to generate a second noise destructive pattern,
said controller to generate the first control signal based on a result of subtracting first and second feedback noise estimations from said first reference noise signal, the first and second feedback noise estimations corresponding to said first reference acoustic sensor, the first feedback noise estimation being based on the first control signal and a path between the first acoustic transducer and the first reference acoustic sensor, and the second feedback noise estimation being based on the second control signal and a path between the second acoustic transducer and the first reference acoustic sensor,
and said controller to generate said second control signal based on a result of subtracting third and fourth feedback noise estimations from said second reference noise signal, said third and fourth feedback noise estimations corresponding to said second reference acoustic sensor, the third feedback noise estimation being based on the second control signal and a path between the second acoustic transducer and the second reference acoustic sensor, and the fourth feedback noise estimation being based on the first control signal and a path between the first acoustic transducer and the second reference acoustic sensor.

2. The quiet fan of claim 1 comprising:
an inlet duct extending from the inlet side of the air-moving device; and an outlet duct extending from the outlet side of the air-moving device.

3. The quiet fan of claim 2, wherein:
the first ANC sub-system is associated with the inlet duct; and
the second ANC sub-system is associated with the outlet duct.

4. The quiet fan of claim 1 comprising:
a first digital filter to generate the first feedback noise estimation by applying to the first control signal a first function representing the path between the first acoustic transducer and the first reference acoustic sensor;
a second digital filter to generate the second feedback noise estimation by applying to the second control signal a second function representing the path between the second acoustic transducer and the first reference acoustic sensor;
a third digital filter to generate the third feedback noise estimation by applying to the second control signal a third function representing the path between the second acoustic transducer and the second reference acoustic sensor; and a fourth digital filter to generate the fourth feedback noise estimation by applying to the first control signal a fourth function representing the path between the first acoustic transducer and the second reference acoustic sensor.

5. The quiet fan of claim 2, wherein:
the first acoustic transducer is disposed in a first chamber adjacent the inlet duct; and
the second acoustic transducer is disposed in a second chamber adjacent the outlet duct.

6. The quiet fan of claim 1, wherein the controller comprises a dual-channel controller to provide said first control signal on a first channel, and to provide said second control signal on a second channel.

7. The quiet fan of claim 1, wherein
the air-moving device is a fan.

8. The quiet fan of claim 7, wherein
the fan is selected from the group consisting of an axial fan, a tangential fan and centrifugal fan.

9. The quiet fan of claim 1 comprising:
at least one duct selected from the group consisting of an inlet duct extending from the inlet side of the air-moving device and an outlet duct extending from the outlet side of the air-moving device,
wherein at least one inside surface of the at least one duct at least one duct is covered with a sound absorption material.

10. A method of implementing noise control for a fan comprising:
controlling an Active Noise Control (ANC) system including a first ANC sub-system on an inlet side of the fan, and a second active ANC sub-system system on an outlet side of the fan,
the first ANC sub-system including a first acoustic transducer, and a first reference acoustic sensor to generate a first reference noise signal corresponding to a first sensed pattern sensed by said first reference acoustic sensor, the first sensed pattern including a first noise pattern from said fan, the first reference acoustic sensor being between the fan and the first acoustic transducer, the first reference acoustic sensor to sense said first sensed pattern prior to the first noise pattern arriving at a location of said first acoustic transducer,
the second ANC sub-system including a second acoustic transducer, and a second reference acoustic sensor to generate a second reference noise signal corresponding to a second sensed noise pattern sensed by said second reference acoustic sensor, the second sensed pattern including a second noise pattern from said fan, the second reference acoustic sensor being between the fan and the second acoustic transducer, the second reference acoustic sensor to sense said second sensed pattern prior to the second noise pattern arriving at a location of said second acoustic transducer;
wherein controlling the ANC system comprises:
generating a first control signal to control said first acoustic transducer to generate a first noise destructive pattern; and
generating a second control signal to control said second acoustic transducer to generate a second noise destructive pattern,
said first control signal being based on a result of subtracting first and second feedback noise estimations from said first reference noise signal, the first and second feedback noise estimations corresponding to said first reference acoustic sensor, the first feedback noise estimation being based on the first control signal and a path between the first acoustic transducer and the first reference acoustic sensor, and the second feedback noise estimation being based on the second control signal and a path between the second acoustic transducer and the first reference acoustic sensor,
and said second control signal being based on a result of subtracting third and fourth feedback noise estimations from said second reference noise signal, the third and fourth feedback noise estimations corresponding to said second reference acoustic sensor, the third feedback noise estimation being based on the second control signal and a path between the second acoustic transducer and the second reference acoustic sensor, and the fourth feedback noise estimation being based on the first control signal and a path between the first acoustic transducer and the second reference acoustic sensor.

11. The method of claim 10 comprising:
generating the first feedback noise estimation by applying to the first control signal a first function representing the path between the first acoustic transducer and the first reference acoustic sensor;
generating the second feedback noise estimation by applying to the second control signal a second function representing the path between the second acoustic transducer and the first reference acoustic sensor;
generating the third feedback noise estimation by applying to the second control signal a third function representing the path between the second acoustic transducer and the second reference acoustic sensor; and
generating the fourth feedback noise estimation by applying to the first control signal a fourth function representing the path between the first acoustic transducer and the second reference acoustic sensor.

12. The method of claim 10, wherein controlling said ANC system comprises:
using an interlaced algorithm to reduce cross-echo between said first and second ANC sub-systems.

13. The method of claim 10, wherein generating said first and second control signals comprises:
generating the first and second control signals via two channels of a dual-channel controller.

14. An active noise control (ANC) system comprising:
a controller to control a first ANC sub-system on an inlet side of an air moving device, and a second ANC sub-system on an outlet side of the air moving device,
the first ANC sub-system including a first acoustic transducer, and a first reference acoustic sensor to generate a first reference noise signal corresponding to a first sensed pattern sensed by said first reference acoustic sensor, the first sensed pattern including a first noise pattern from said air-moving device, the first reference acoustic sensor being between the air-moving device and the first acoustic transducer, the first reference acoustic sensor to sense said first sensed pattern prior to the first noise pattern arriving at a location of said first acoustic transducer,
the second ANC sub-system including a second acoustic transducer, and a second reference acoustic sensor to generate a second reference noise signal corresponding to a second sensed noise pattern sensed by said second reference acoustic sensor, the second sensed pattern including a second noise pattern from said air-moving device, the second reference acoustic sensor being between the air-moving device and the second acoustic transducer, the second reference acoustic sensor to sense said second sensed pattern prior to the second noise pattern arriving at a location of said second acoustic transducer, the controller to control the first acoustic transducer of said first ANC sub-system based on the first reference noise signal, and to control the second acoustic transducer of said second ANC sub-system based on the second reference noise signal, wherein said controller is to generate a first control signal to control said first acoustic transducer to generate a first noise destructive pattern, and to generate a second control signal to control said second acoustic transducer to generate a second noise destructive pattern, said first control signal being based on a result of subtracting first and second feedback noise estimations from said first reference noise signal, the first and second feedback noise estimations corresponding to said first acoustic sensor, the first feedback noise estimation being based on the first control signal and a path between the first acoustic transducer and the first acoustic sensor, and the second feedback noise estimation being based on the second control signal and a path between the second acoustic transducer and the first acoustic sensor, and said second control signal being based on a result of subtracting third and fourth feedback noise estimations from said second reference noise signal, the third and fourth feedback noise estimations corresponding to said second acoustic sensor, the third feedback noise estimation being based on the second control signal and a path between the second acoustic transducer and the second acoustic sensor, and the fourth feedback noise estimation being based on the first control signal and a path between the first acoustic transducer and the second acoustic sensor.

15. The system of claim 14, wherein the first feedback noise estimation represents a first function applied to the first control signal, the first function representing the path between the first acoustic transducer and the first acoustic sensor;

wherein the second feedback noise estimation represents a second function applied to the second control signal, the second function representing the path between the second acoustic transducer and the first acoustic sensor;

wherein the third feedback noise estimation represents a third function applied to the second control signal, the third function representing the path between the second acoustic transducer and the second acoustic sensor; and and wherein the fourth feedback noise estimation represents a fourth function applied to the first control signal, the fourth function representing the path between the first acoustic transducer and the second acoustic sensor.

16. The system of claim 14, wherein the controller comprises a first controller to generate said first control signal and a second controller to generate said second control signal.

17. The system of claim 14, wherein the controller comprises a dual channel controller to generate said first control signal on a first channel, and to generate said second control signal on a second channel.

18. The system of claim 14, wherein the controller is to generate said first and second control signals to reduce cross echo between said first acoustic transducer and said second acoustic sensor.

19. The system of claim 14, wherein the controller is to generate said first and second control signals to reduce cross echo between said second acoustic transducer and said first acoustic sensor.

20. The system of claim 14 comprising:
a first digital filter to generate the first feedback noise estimation by applying to the first control signal a first function representing the path between the first acoustic transducer and the first acoustic sensor; and
a second digital filter to generate the second feedback noise estimation by applying to the second control signal a second function representing the path between the second acoustic transducer and the first acoustic sensor;
a third digital filter to generate the third feedback noise estimation by applying to the second control signal a third function representing the path between the second acoustic transducer and the second acoustic sensor; and
a fourth digital filter to generate the fourth feedback noise estimation by applying to the first control signal a fourth function representing the path between the first acoustic transducer and the second acoustic sensor.

21. The system of claim 14 comprising:
a first subtractor to generate a first input signal by subtracting the first and second feedback noise estimations from said first reference noise signal; and
a second subtractor to generate a second input signal by subtracting the third and fourth feedback noise estimations from said second reference noise signal,
wherein said controller is to generate said first control signal based on said first input signal and to generate said second control signal based on said second input signal.

22. The system of claim 14, wherein said air moving device comprises a fan.

* * * * *